US012236073B2

(12) United States Patent
Choi et al.

(10) Patent No.: US 12,236,073 B2
(45) Date of Patent: Feb. 25, 2025

(54) ELECTRONIC DEVICE HAVING DISPLAY MAGNIFICATION FUNCTION, AND ELECTRONIC DEVICE OPERATION METHOD

(71) Applicant: SAMSUNG ELECTRONICS CO., LTD., Suwon-si (KR)

(72) Inventors: Duyeong Choi, Suwon-si (KR); Seonkeun Park, Suwon-si (KR); Jungwon Lee, Suwon-si (KR); Jaewoong Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/303,180

(22) Filed: Apr. 19, 2023

(65) Prior Publication Data

US 2023/0289047 A1 Sep. 14, 2023

Related U.S. Application Data

(63) Continuation of application No. PCT/KR2021/014361, filed on Oct. 15, 2021.

(30) Foreign Application Priority Data

Oct. 19, 2020 (KR) .................. 10-2020-0135409

(51) Int. Cl.
*G06F 3/04845* (2022.01)
*G06F 1/16* (2006.01)
*H04M 1/72469* (2021.01)

(52) U.S. Cl.
CPC ........ *G06F 3/04845* (2013.01); *G06F 1/1652* (2013.01); *H04M 1/72469* (2021.01)

(58) Field of Classification Search
CPC .............. G06F 3/04845; G06F 1/1652; G06F 2203/04807; G06F 1/1624; G06F 1/1643;
(Continued)

(56) References Cited

U.S. PATENT DOCUMENTS 8,275,420 B2 9/2012 Lim
8,558,872 B1 10/2013 Cho
(Continued)

FOREIGN PATENT DOCUMENTS

CN 107316567 B 9/2020
JP 2011165165 A 8/2011
(Continued)

OTHER PUBLICATIONS

International Search Report for PCT/KR2021/014361 mailed Feb. 9, 2022, 2 pages.
(Continued)

*Primary Examiner* — Patrick F Riegler
*Assistant Examiner* — Alvaro R Calderon, IV
(74) *Attorney, Agent, or Firm* — Nixon & Vanderhye, P.C.

(57) ABSTRACT

An example may include a display in which a display area of the display is expandable and retractable, a memory, and a processor operatively connected to the display and the memory, wherein the memory includes instructions causing, when executed, the processor to: display an execution screen of a running application on the display area at a first magnification value; expand the display area on the basis of a first designated input; based at least in part on the first designated input, information related to the application, and a first user content included in the execution screen, determine whether to maintain a display magnification of the display at the first magnification value or change the display magnification to a second magnification value different from
(Continued)

the first magnification value; and display the execution screen on the expanded display area based on the determined display magnification.

20 Claims, 15 Drawing Sheets

(58) Field of Classification Search
CPC .. G06F 1/1677; G06F 3/04817; G06F 3/0482; G06F 3/04842; G06F 3/04883; G06F 2203/04806; H04M 1/72469; H04M 1/0241; H04M 1/0235; H04M 1/027; H04M 1/0268; H04M 2201/38
See application file for complete search history.

(56) References Cited

U.S. PATENT DOCUMENTS

| | | | |
|---|---|---|---|
| 8,823,774 B2 | 9/2014 | Cho | |
| 9,013,368 B1* | 4/2015 | Kim | G06F 1/1641 |
| | | | 345/1.3 |
| 9,262,059 B2 | 2/2016 | Kim et al. | |
| 9,305,523 B2 | 4/2016 | Shin | |
| 10,013,955 B2 | 7/2018 | Oh et al. | |
| 10,488,947 B2 | 11/2019 | Kwon et al. | |
| 10,490,169 B2 | 11/2019 | Oh et al. | |
| 10,911,586 B2 | 2/2021 | Kim et al. | |
| 10,916,226 B2 | 2/2021 | Oh et al. | |
| 11,150,742 B2 | 10/2021 | Kwon et al. | |
| 11,209,865 B2 | 12/2021 | Jung et al. | |
| 2010/0167791 A1* | 7/2010 | Lim | G06F 1/1624 |
| | | | 455/566 |
| 2013/0275910 A1* | 10/2013 | Kim | G06F 1/1652 |
| | | | 715/800 |
| 2013/0342439 A1* | 12/2013 | Kwack | G06F 3/0412 |
| | | | 345/156 |
| 2015/0022436 A1* | 1/2015 | Cho | G06F 1/1615 |
| | | | 345/156 |
| 2015/0220119 A1* | 8/2015 | Seo | G09G 5/37 |
| | | | 345/173 |
| 2015/0227223 A1* | 8/2015 | Kang | H04M 1/0243 |
| | | | 345/173 |
| 2015/0331593 A1* | 11/2015 | Lee | G06F 1/1641 |
| | | | 345/667 |
| 2016/0349971 A1 | 12/2016 | Chi et al. | |
| 2017/0140504 A1* | 5/2017 | Jeong | G06F 1/1677 |
| 2017/0185215 A1* | 6/2017 | Kim | G06F 1/1652 |
| 2018/0032106 A1* | 2/2018 | Yu | G06F 1/1652 |
| 2018/0329514 A1* | 11/2018 | Kwon | G06F 3/03 |
| 2018/0374452 A1* | 12/2018 | Choi | G06F 3/04886 |
| 2019/0042066 A1* | 2/2019 | Kim | H04M 1/725 |
| 2019/0261519 A1* | 8/2019 | Park | G06F 1/1677 |
| 2020/0019305 A1 | 1/2020 | Yang et al. | |
| 2020/0409517 A1* | 12/2020 | Nakanishi | G06T 3/60 |
| 2021/0118971 A1* | 4/2021 | Wakata | G09G 3/3233 |
| 2021/0263564 A1* | 8/2021 | Chen | G06F 3/0481 |
| 2022/0113767 A1 | 4/2022 | Jung et al. | |
| 2022/0116533 A1* | 4/2022 | Yan | H04M 1/0216 |

FOREIGN PATENT DOCUMENTS

| | | |
|---|---|---|
| KR | 20100009008 A | 1/2010 |
| KR | 20100079100 A | 7/2010 |
| KR | 20140000028 A | 1/2014 |
| KR | 20160139320 A | 12/2016 |
| KR | 20160150533 A | 12/2016 |
| KR | 20170090295 A | 8/2017 |
| KR | 102014791 B1 | 10/2019 |
| KR | 102076539 B1 | 4/2020 |
| WO | 2013191315 A1 | 12/2013 |

OTHER PUBLICATIONS

Written Opinion of the ISA for PCT/KR2021/014361 mailed Feb. 9, 2022, 4 pages.
Office Action dated Nov. 19, 2024 in Korean Patent No. 10-2020-0135409 and English-language translation.

* cited by examiner

ELECTRONIC DEVICE HAVING DISPLAY MAGNIFICATION FUNCTION, AND ELECTRONIC DEVICE OPERATION METHOD

CROSS-REFERENCE TO RELATED APPLICATIONS

This application is a continuation of International Application No. PCT/KR2021/014361, designating the United States, filed on Oct. 15, 2021, in the Korean Intellectual Property Receiving Office and claiming priority to Korean Patent Application No. 10-2020-0135409, filed on Oct. 19, 2020 in the Korean Intellectual Property Office. The disclosures of each of these applications are incorporated by reference herein in their entireties.

BACKGROUND

Field

The disclosure relates to an electronic device and an operation method for the electronic device.

Description of Related Art

Recently, electronic devices may have various form factors. The structure of a display may also be variously modified according to the form factor of an electronic device. In particular, an electronic device having a form factor in which the size of a display changes, is being developed, such as a slidable device, a foldable device, a rollable device, or a multi-foldable device.

SUMMARY

When a user of an electronic device expands or retracts a display of an electronic device while inputting data, continuous work is hard because previously displayed data is not displayed on the display while the user is scrolling a screen.

Various example embodiments disclosed herein provide an electronic device that maintains or changes a display magnification of a display whose size has been changed when the electronic device expands or retracts the display.

Various embodiments disclosed herein provide an electronic device that maintains or changes a display magnification of a display based at least in part on a specified input, information related to an application being executed or user content included in an execution screen of the application, when the display is expanded or retracted.

According to an example embodiment, an electronic device includes a display in which a display area of the display is expandable and retractable, a memory, and a processor operatively connected to the display and the memory, wherein the memory includes instructions that, when executed, cause the processor to display an execution screen of an application being executed on the display area at a first magnification value, expand the display area based on a first specified input, determine whether to maintain a display magnification of the display at the first magnification value, or change the display magnification of the display to a second magnification value different from the first magnification value, based at least in part on the first specified input, information related to the application, or first user content included in the execution screen, and display the execution screen on the expanded display area based on the determined display magnification.

According to an example embodiment, an operation method for an electronic device including a display in which a display area of the display is expandable and retractable includes displaying an execution screen of an application being executed on the display area at a first magnification value, expanding the display area based on a first specified input, determining whether to maintain a display magnification of the display at the first magnification value, or change the display magnification of the display to a second magnification value different from the first magnification value, based at least in part on the first specified input, information related to the application, or first user content included in the execution screen, and displaying the execution screen on the expanded display area based on the determined display magnification.

According to the example embodiments, an electronic device can be provided that maintains or changes the display magnification of the display whose size has changed when the electronic device expands or contracts the display.

According to the example embodiments, an electronic device can be provided that maintains or changes a display magnification of a display based at least in part on a specified input, information related to an application being executed, or user content included in an execution screen of the application when the display is expanded or retracted.

In addition, various effects may be provided that will be directly or indirectly understood through this disclosure.

BRIEF DESCRIPTION OF THE DRAWINGS

The above and/or other aspects of the disclosure will be more apparent by describing certain embodiments of the disclosure with reference to the accompanying drawings, in which.

In the description of the drawings, the same or similar reference numerals may be used for the same or similar components.

DETAILED DESCRIPTION

Figure 1:
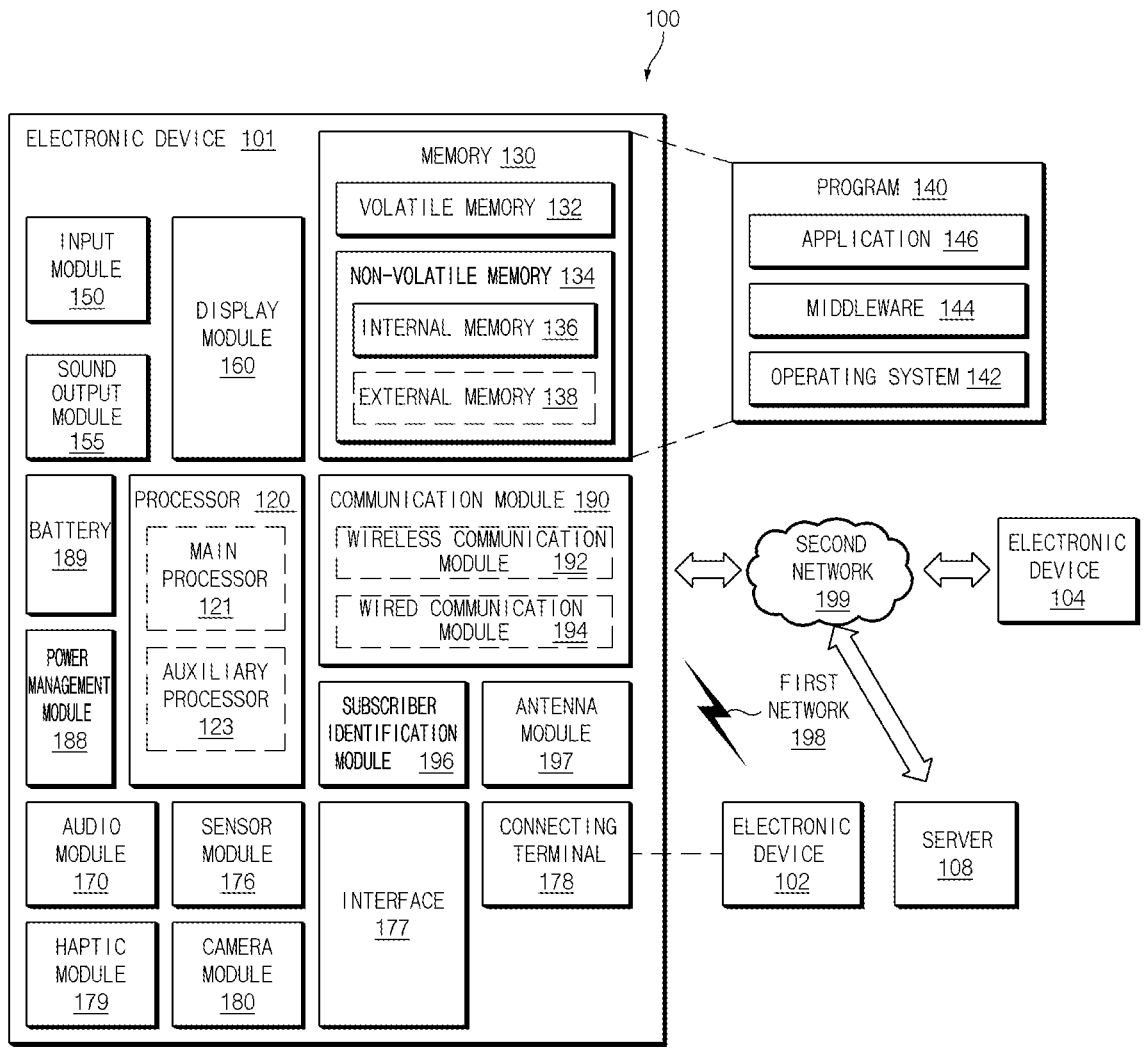
FIG. 1 is a block diagram of an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added to the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190

(e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
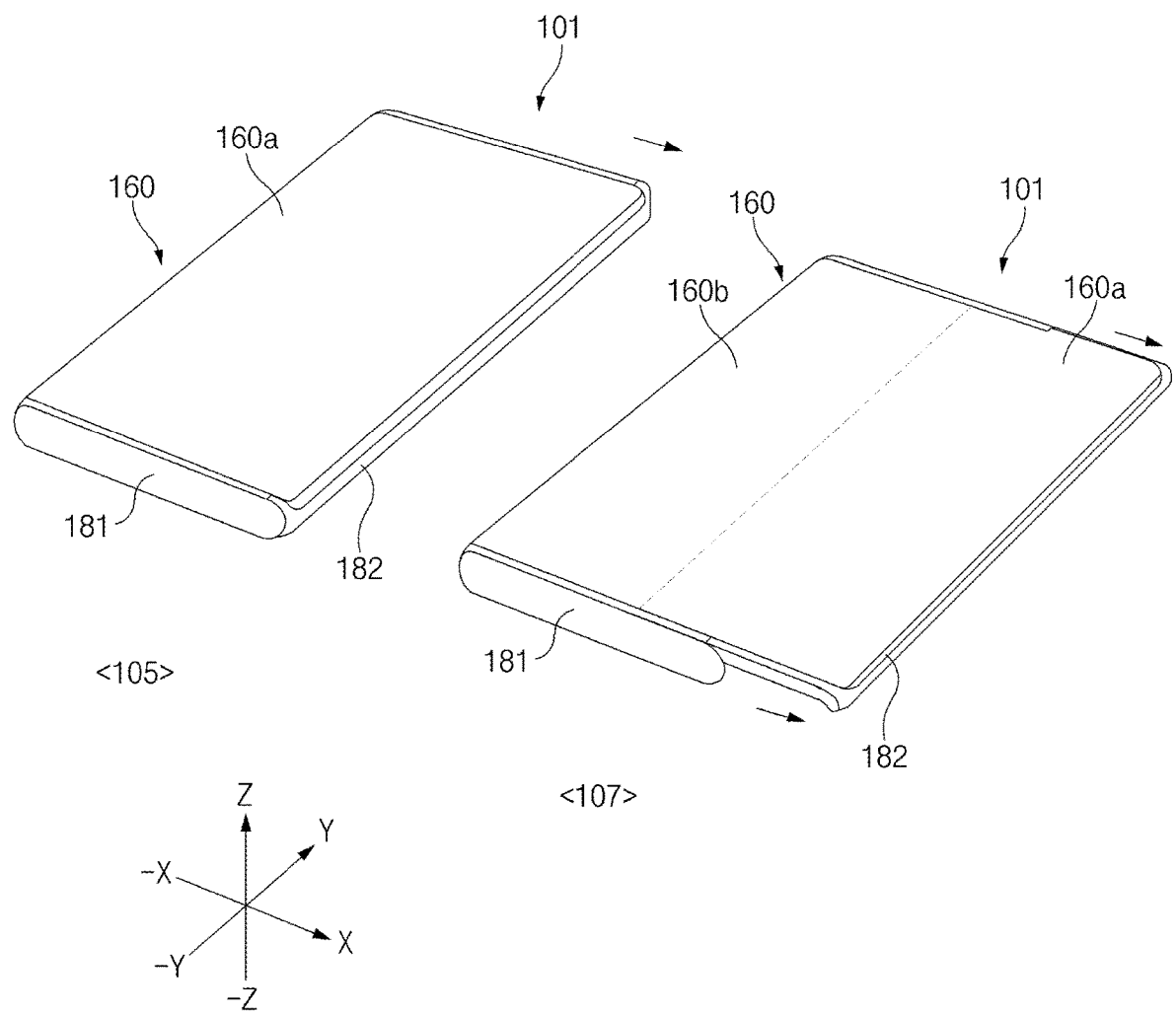
FIG. 2 is a diagram showing an example of an external form of an electronic device according to various embodiments.

FIG. 2 is a diagram showing an example of an external form of an electronic device according to various embodiments.

Referring to FIG. 2, the electronic device 101 according to an embodiment may include the display 160 (e.g., a flexible display having at least a flexible portion), a first housing 181, and a second housing 182. For example, the first housing 181 may serve as a fixed cover accommodating the second housing and a portion of the display. The second housing 182 may serve as a sliding cover to which one side of the display 160 is fixed. The second housing 182 may be moved in a first direction (e.g., an X-axis direction) or in a second direction (e.g., a −X-axis direction opposite to the first direction) with respect to the first housing 181. As in state 105, when the first housing 181 and the second housing 182 overlap each other by a first width, a first display area 160*a* of a first size may be disposed to face an upward direction (e.g., in a Z-axis direction). Alternatively, in state 105, the display 160 may include the first display area 160*a* of the first size visually exposed to the outside.

According to an embodiment, in state 105, the first housing 181 may be disposed to surround at least a portion of the first display area 160*a* in the second direction (e.g., −X-axis direction), at least a portion of the first display area 160*a* in a third direction (e.g., Y-axis direction), at least a portion of the first display area 160*a* in a fourth direction (e.g., −Y-axis direction), and at least a portion of the first display area 160*a* in a fifth direction (e.g., −Z-axis direction or a direction opposite to the Z-axis direction). The second housing 182 may be disposed to surround at least a portion of the first display area 160*a* in the first direction (e.g., X-axis direction), at least a portion of the first display area 160*a* in the third direction (e.g., Y-axis direction), at least a portion of the first display area 160*a* in the fourth direction (e.g., −Y-axis direction), and at least a portion of the first display area 160*a* in the fifth direction (e.g., −Z-axis direction).

According to an embodiment, in state 105, at least a portion of a second display area 160*b* expanding from the first display area 160*a* may be rolled up the interior of at least one of the first housing 181 and the second housing 182 or unfolded. In this state, a surface which the pixels of the first display area 160*a* emit light toward may be arranged to face in a front direction (e.g., the Z-axis direction), and at least a portion of an upper surface of the second display area 160*b* where the pixels are disposed may be arranged to face a rear direction (e.g., −Z axis direction). A portion of the second display area 160*b* may be bent and disposed.

According to an embodiment, when the second housing 182 is moved in the first direction (e.g., the X-axis direction) with respect to the first housing 181, a visual exposure area of the display 160 may be expanded. For example, as in state 107 (e.g., a state in which the second housing 182 has performed a sliding operation to expand the area of the display 160), when the first housing 181 and the second housing 182 overlap each other by a second width (e.g., a size smaller than the first width), the display 160 may include the first display area 160*a* having the first size and the second display area 160*b* having a second size, which are visually exposed to the outside (or face in the upward direction (e.g., the Z-axis direction)). In state 107, the first size of the first display area 160*a* and the second size of the second display area 160*b* may be equal to each other. Alternatively, the first size may be larger than the second size. According to various embodiments, the second size may vary according to a sliding operation distance or a movement distance of the second housing 182.

According to an embodiment, the display 160 may be kept in a state in which a portion has been rolled in state 105, and may have a state in which the at least a portion which had been rolled is unfolded in state 107. For example, in state 107, the first housing 181 may be disposed to surround at least a portion of the second display area 160b in the second direction (e.g., −X-axis direction), at least a portion of the second display area 160b in the third direction (e.g., Y-axis direction), at least a portion of the second display area 160b in the fourth direction (e.g., −Y-axis direction), and at least a portion of the second display area 160b in the fifth direction (e.g., −Z-axis direction or a direction opposite to the Z-axis direction).

According to various embodiments, the second housing 182 may be connected to the interior of the first housing 181 in at least a portion thereof, and may be slidable along an inner surface of the first housing 181 in any one of the first direction (e.g., the X-axis direction) and the second direction (e.g., −X axis direction). While the first housing 181 and the second housing 182 are sliding, the first housing 181 and the second housing 182 may be disposed to surround edges of the display 160. Various electronic elements related to driving the display 160, electronic elements related to various user functions supported by the electronic device 101, and/or a battery may be disposed inside the first housing 181 and the second housing 182.

Figure 3:
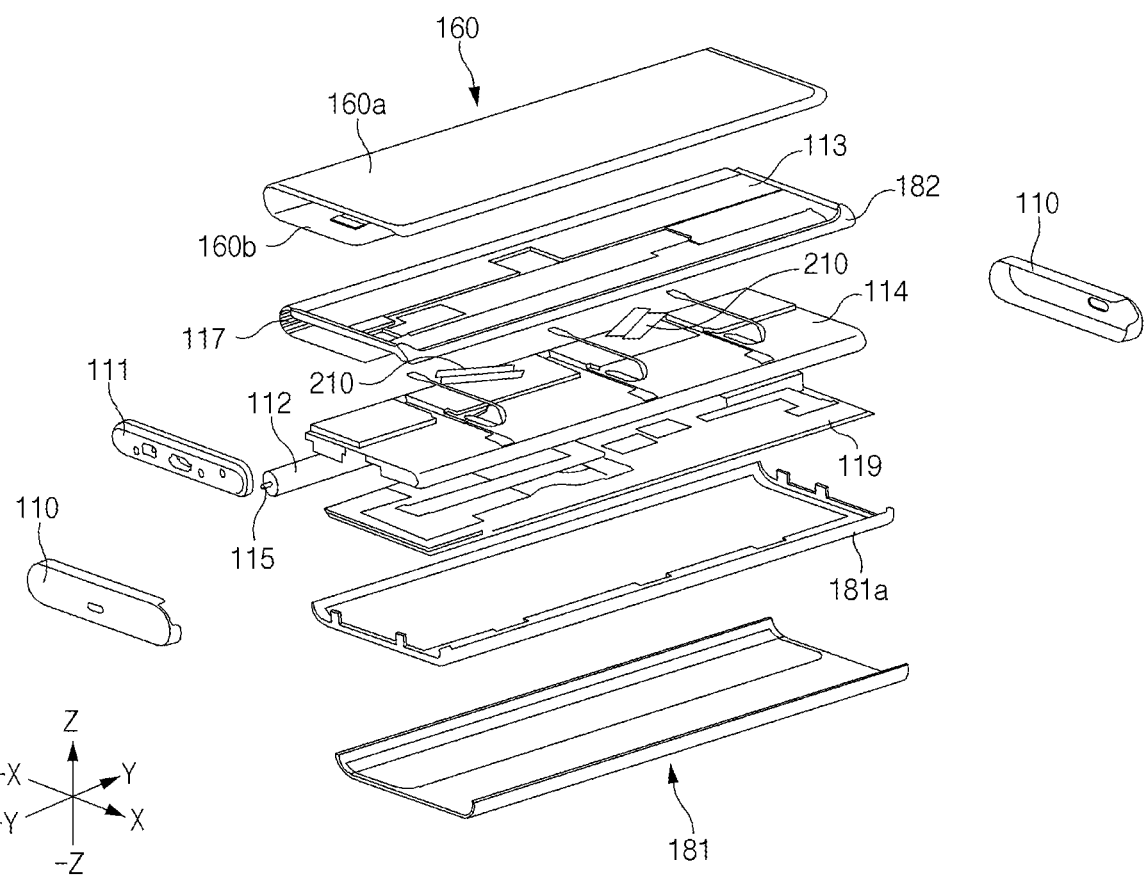
FIG. 3 is a diagram illustrating an exploded perspective view showing configurations of the electronic device of FIG. 2.

FIG. 3 is a diagram illustrating an exploded perspective view showing configurations of the electronic device of FIG. 2.

Referring to FIG. 3, the electronic device 101 according to an embodiment may include the display 160, a panel support member 117, a display support member 113, a support structure 114, a sliding support member 111, an actuator 112, an elastic module 210, a printed circuit board 119, the first housing 181, and the second housing 182.

According to an embodiment, the display 160 may include a plurality of pixels arranged in a matrix form, and at least some of the pixels may be provided in a flexible form. For example, the display 160 may include a panel layer on which the plurality of pixels is disposed and a screen is displayed and an outer protective layer disposed on the panel layer. The outer protective layer may be formed of a polymer structure (e.g., polyimide) or glass. Additionally, the display 160 may further include a touch panel layer. As described in FIG. 2, the display 160 may include the first display area 160a and the second display area 160b. At least a portion of the second display area 160b may be rolled on the interior of the first housing 181 in state 105 of FIG. 2, and may be visually exposed to the outside of the first housing 181 in state 107. While at least a portion of the second display area 160b is rolled and bent around a rotating shaft 115 (or a rolling gear portion, or a rotating shaft member), the remaining portion of the second display area 160b may be disposed on the back side of the first display area 160a.

According to an embodiment, one side of the display 160 (e.g., at least a portion of the second display area 160b) may be accommodated inside at least one of the first housing 181 and the second housing 182. In this state, one end of the display 160 disposed inside the electronic device 101 may be fastened to an elastic member. For example, when the second display area 160b of the display 160 is being exposed to the outside, the elastic force by the elastic member may act as a tension on the display 160 so that the repulsive force in the curved portion of the display 160 may be offset. Due to this, a portion around which the display 160 is rolled may be kept uniformly.

According to an embodiment, the display support member 113 may have a specified rigidity and support the display 160. For example, at least a portion of the display support member 113 may be made of aluminum or an aluminum alloy, and a surface of the display support member 113 facing the display 160 may be flat. For example, the at least a portion of the display support member 113 may be formed of an injection-molded material (e.g., a structure including plastic or magnesium). In state 105 of FIG. 2, a first surface of the display support member 113 (e.g., a surface observed in the Z-axis direction) may be disposed to face a rear surface of the first display area 160a (e.g., a surface observed in the −Z-axis direction) and a second surface of the display support member 113 (e.g., a surface observed in the −Z-axis direction) may be disposed to face a upper surface of the support structure 114 (e.g., a surface observed in the Z-axis direction).

According to an embodiment, at least a portion of the display support member 113 (or the display 160) may be coupled to the second housing 182 and may be slidable according to the sliding motion of the second housing 182. Alternatively, the second housing 182 may be moved by the actuator 112. In this regard, a separate physical button capable of instructing driving of the actuator may be disposed in the electronic device 101 or a menu related to driving of the actuator may be output on a display screen of the display 160. While at least a portion of the panel support member 117 is moved in the first direction (e.g., the X-axis direction) when the second housing 182 is moved in the first direction (e.g., the X-axis direction), the arrangement direction of the second display area 160b of the display 160 fixed to the panel support member 117 may be changed from the sixth direction (e.g., −Z-axis direction) to the fifth direction (Z-axis direction). While the second housing 182 is moved in the first direction (e.g., X-axis direction), at least a portion of the panel support member 117 may be moved to a side of the second housing 182 while being disposed on a lower surface of the second housing 182.

According to an embodiment, the panel support member 117 may have a form in which a plurality of pillar parts (or protrusions, long bars, or slates) having a certain length are arranged at regular intervals in the third direction (e.g., Y-axis direction). At least a portion of the panel support member 117 may form an orbit, and move (or slide) a portion of the display (e.g., the second display area 160b) disposed on the orbit. A length of one side of the protrusions may correspond to a length of one side of the display 160. The panel support member 117 may be disposed to surround at least a portion of the support structure 114. The plurality of protrusions included in the panel support member 117 may be formed such that portions of plurality of protrusions, which face the rear surface of the display 160, are flat and portions of plurality of protrusions which face the support structure 114 (e.g., portions facing the rotational shaft 115) protrude. For example, the lower surface of the panel support member 117 (e.g., one surfaces of the protrusions facing the rotational shaft 115) may be formed to have ridges and valleys of gears repeatedly thereon. According to a sliding motion, among the plurality of protrusions included in the panel support member 117, the protrusions disposed on the upper or lower surface of the support structure 114 are continuously arranged with other neighboring protrusions to form a flat surface. Among the plurality of protrusions included in the panel support member 117, protrusions disposed at positions facing the rotational shaft 115 may be spaced apart from neighboring protrusions by a certain distance. The panel support member 117 may include a connecting chain or a connecting shaft connecting a plurality of protrusions. At least one of the plurality of protrusions may include a material that responds to magnetic force (e.g., a magnetic material (an object that forms an attractive force in response to magnetic force) or a magnet).

According to an embodiment, the rotational shaft 115 (or a rolling gear part, or a rotational shaft member) has a length similar to the length of one side of the panel support member 117 and may be disposed at one edge of the support structure 114. For example, the rotational shaft 115 may be provided in a cylindrical rod shape. The center of both sides of the rotational shaft 115 may be formed to protrude more than the periphery. The protruding center of both sides of the rotational shaft 115 may be mounted on one side of the support structure 114. Accordingly, while the second housing 182 is moved in the first direction (e.g., the X-axis direction), the rotational shaft 115 may rotate. At least a portion of the rotational shaft 115 may be gear-coupled with the panel support member 117. Alternatively, the rotational shaft 115 may contact at least a portion of the panel support member 117. While the rotational shaft 115 rotates, the arrangement shape of the panel support member 117 may be changed.

According to an embodiment, the actuator 112 may generate a driving force by receiving power from a battery included in the electronic device 101. A pinion gear may be disposed at one side of the actuator 112, and the pinion gear may mesh with a rack formed at one side of the panel support member 117. According to the operation of the actuator 112, the second housing 182 and the display 160 may move in the first direction (e.g., X-axis direction) or in the second direction (e.g., -X-axis direction). The actuator 112 may be disposed to extend in the longitudinal direction (e.g., the Y axis or -Y axis direction) of the support structure 114, and at least one actuator 112 may be disposed.

According to an embodiment, at least one piece of hardware related to driving of the electronic device 101 (e.g., the printed circuit board 119, a processor, and a battery) may be disposed inside the support structure 114. For example, the printed circuit board 119 may be disposed between the support structure 114 and the first housing 181. Electronic elements (e.g., a processor, a communication circuit, a memory, and/or a sensor module) for driving the electronic device 101 may be disposed on the printed circuit board 119.

According to an embodiment, the sliding support member 111 may be fastened to one side of the support structure 114. The sliding support member 111 may be fastened to the second housing 182 such that the second housing 182 and the display 160 are movable.

According to an embodiment, the elastic module 210 may assist the movement of the second housing 182. For example, the elastic module 210 may include a first spring and a second spring coupled to each other in a complementary manner. A portion of the elastic module 210 may be coupled to the support structure 114. Another portion of the elastic module 210 may be coupled to the second housing 182. Accordingly, the elastic module 210 may apply an elastic force in the second direction (e.g., the -X-axis direction) until the second housing 182 moves up to a specified point in the first direction (e.g., the X-axis direction). When the second housing 182 has passed the specified point while moving in the first direction (e.g., the X-axis direction), the elastic module 210 may apply an elastic force in the first direction (e.g., the X-axis direction)

According to an embodiment, the first housing 181 may include a cover base 181a including a bottom surface on which at least a portion of the support structure 114 is seated and side walls disposed to surround edges of the support structure 114 (e.g., side portions disposed at ends in the X-axis direction and the -X-axis direction) and a guard member 110 fixing the edges of the support structure 114 (e.g., side portions disposed at the ends in the Y-axis direction and the -Y-axis direction). A fastening portion may be disposed in the third direction (e.g., Y-axis direction) or the fourth direction (e.g., -Y-axis direction) of the first housing 181, and the guard member 110 may be fastened with the fastening portion to close at least a portion of the first housing 181 in the third direction (e.g., Y-axis direction) or the fourth direction (e.g., -Y-axis direction). The side of the first housing 181 in the first direction (e.g., the X-axis direction) may be open, and the second housing 182 may be fastened to the first housing 181 in the first direction (e.g., the X-axis direction).

According to an embodiment, the second housing 182 may be fastened to the first housing 181 in the first direction (e.g., the X-axis direction). The second housing 182 may include sidewalls (e.g., sidewalls disposed in the X-axis direction, the Y-axis direction, and the -Y-axis direction) surrounding some side surfaces of the support structure 114. The second housing 182 may be moved in the first direction (e.g., X-axis direction) or the second direction (e.g., -X-axis direction) while being seated on the support structure 114. In this case, the arrangement form and position of the second housing 182 may be changed according to an operation of the actuator. Alternatively, the arrangement form and position of the second housing 182 may be changed through external force by a user.

Meanwhile, a structure in which various components of the electronic device 101 are arranged has been described above, but the disclosure is not limited thereto. For example, the electronic device 101 according to an embodiment of the disclosure may include a display, a first housing surrounding one side of the display, a panel support member disposed on the one side of the display, a rotating shaft contacting the panel support member, and a second housing fastened with the first housing, and other configurations may be added or excluded as needed.

The above-described electronic device 101 may include an actuator and may operate such that the second display area 160b may be automatically expanded or retracted according to control of the actuator. Alternatively, when the second housing 182 is moving in the first direction (e.g., the X-axis direction) by an external pressure applied to the second housing 182 in the electronic device 101, the panel support member 117 and the rotating shaft 115, which are engaged with the second housing 182, are rotated, so that the second display area 160b may be expanded or retracted manually. Alternatively, the rotating shaft 115 is disposed on the second housing 182 and the display 160 is fixed to the first housing 181, so that a partial area of the display 160 accommodated in the second housing 182 may be expanded or retracted according to movement of the second housing 182 in the electronic device 101.

Figure 4:
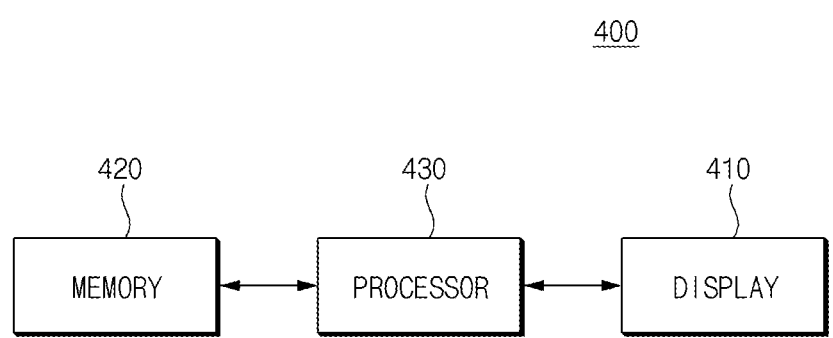
FIG. 4 is a block diagram of an example electronic device according to various embodiments.

FIG. 4 is a block diagram of an example electronic device according to various embodiments.

Referring to FIG. 4, an electronic device 400 (e.g., the electronic device 101 of FIG. 1) may include a display 410 (e.g., the display module 160 of FIG. 1), a memory 420 (e.g., the memory 130 of FIG. 1) and a processor 430 (e.g., processor 120 of FIG. 1).

According to an embodiment, the display 410 may include at least a partial flexible area. According to an embodiment, the display 410 may be configured to be expandable and retractable. For example, the display 410 may include at least one of a slidable display, a foldable display, and a rollable display.

According to an embodiment, the display 410 may be retracted such that at least a partial area of the display 410 is not exposed to the outside. For example, a state in which at least a partial area of the display 410 is retracted may be referred to, for example, as a first state. For example, the state in which at least a partial area of the display 410 is retracted may be a folded state or a rolled state.

According to an embodiment, the display 410 may be expanded such that the at least a partial area of the display 410 is exposed to the outside. For example, a state in which the display 410 is expanded may be referred to, for example, as a second state. For example, the state in which the display 410 is expanded may be an unfolded state or an unrolled state.

According to an embodiment, the display 410 may be expanded or retracted in an automatic manner, a semi-automatic manner, or a manual manner. According to an embodiment, the display 410 may further include a driving motor (not shown) therein. For example, the display 410 employing an automatic manner may be automatically expanded or retracted using a driving motor based on a specified signal generated by the processor 430. For example, the display 410 employing a semi-automatic manner may be automatically expanded using a driving motor based on a specified signal generated by the processor 430 when the display has been retracted, and may be retracted in such a way that a user directly applies force when the display has been expanded. For example, the display 410 employing a manual manner may be expanded or retracted in such a way that the user directly applies force. The display described with reference to the drawings to be described below may be expanded or retracted in the above-described automatic, semi-automatic, or manual manner.

According to an embodiment, the display 410 may be expanded based on an input applied to a pre-specified area. For example, when an input provided by a user (e.g., an input based on a physical key, a touch input, a long press input, or a specified-pattern input (e.g., knock)) is applied to the pre-specified area of the display 410 while the display has been retracted, the display 410 may be automatically expanded. In various embodiments, the display 410 may be expanded when an input provided by an external input device (not shown) (e.g., a stylus pen) is applied to a pre-specified area while the display has been retracted.

According to an embodiment, the memory 420 may store at least one program, application, data, or instructions to be executed by the processor 430. According to an embodiment, the memory 420 may include at least a portion of the memory 130 shown in FIG. 1. According to an embodiment, the memory 420 may include information or instructions for causing at least a part of an operation of the electronic device 400 to be described below to be performed. According to an embodiment, the memory 420 may include instructions related to a plurality of applications executed by the processor 430.

According to an embodiment, the processor 430 (including, e.g., processing circuitry) may control the display magnification of the display 410 when the display 410 changes from a retracted state to an expanded state or from the expanded state to the retracted state. According to an embodiment, the processor 430 may determine a display magnification of the display 410 whose size has changed, based at least in part on information related to an application being executed or content being displayed on the display 410.

For example, the processor 430 may display an execution screen of an application on the display 410 at a first magnification value (or a reference magnification value). For example, when the display 410 is expanded, the processor 430 may maintain a display magnification of the expanded display (e.g., the display in the second state) at the first magnification value that is the same as the display magnification before the display 410 is expanded (e.g., the retracted state) based at least in part on information related to an application being executed or content being displayed on the display 410. For example, when the display 410 is expanded, the processor 430 may change a display magnification of the expanded display to a second magnification value that is different from the display magnification before the display 410 is expanded based at least in part on information related to an application being executed or content being displayed on the display 410.

For example, the processor 430 may display an execution screen of an application on the display 410 at the first magnification value (or the reference magnification value). For example, when the display 410 is retracted, the processor 430 may maintain a display magnification of the retracted display (e.g., the display in the first state) at the first magnification value that is the same as the display magnification before the display 410 is retracted (e.g., the expanded state) based at least in part on information related to an application being executed or content being displayed on the display 410. For example, when the display 410 is retracted, the processor 430 may change a display magnification of the retracted display to the second magnification value that is different from the display magnification before the display 410 is retracted based at least in part on information related to an application being executed or content being displayed on the display 410.

According to an embodiment, the processor 430 may display a user interface configured to select whether to maintain the display magnification of the display 410 on at least a portion of the display 410 as the size of the display 410 changes.

For example, when the display 410 changes from a retracted state to an expanded state, the processor 430 may maintain the display magnification of the expanded display 410 at a magnification the same as that of the retracted display 410 based on an input received from the user via the user interface. For example, when the display 410 changes from a retracted state to an expanded state, the processor 430 may change the display magnification of the expanded display 410 to a magnification different from that of the retracted display 410 based on an input received from the user via the user interface.

For example, when the display 410 changes from the expanded state to the retracted state, the processor 430 may maintain the display magnification of the retracted display 410 at a magnification the same as that of the expanded display 410 based on an input received from the user via the user interface. For example, when the display 410 changes from the expanded state to the retracted state, the processor 430 may change the display magnification of the retracted display 410 to a magnification different from that of the expanded display 410 based on an input received from the user via the user interface.

According to an embodiment, the processor 430 may determine the display magnification of the display 410 based on application-related information. For example, the processor 430 may periodically and/or non-periodically obtain application-related information, including a use history of an application, and store the application-related information in at least a portion of the memory 420. For example, the use history of an application may include the number (or degree) of times the user maintains or changes the display magnification of the display 410 when the size of the display 410 changes while the application is being executed.

For example, in a case in which the display 410 is expanded while the first application is being executed, when the number (or degree) of times the display magnification of the expanded display is kept identical to that of the retracted display 410 is relatively high (e.g., greater than some predetermined number of times), the processor 430 may maintain the display magnification of the expanded display 410 without changing based on the use history of a first application. For example, the processor 430 may display an execution screen of the first application at the same magnification on the display 410 by being kept identical to the display magnification of the retracted display 410.

For example, in a case in which the display 410 is expanded while the first application is being executed, when the number (or degree) of times the display magnification of the expanded display is kept identical to that of the retracted display 410 is relatively low (e.g., less than some predetermined number of times), the processor 430 may change the display magnification of the expanded display 410 based on the use history of a first application. For example, the processor 430 may set the display magnification of the expanded display 410 to a value greater than the display magnification of the retracted display 410 to display the enlarged execution screen of the first application on the display 410. For example, the processor 430 may set the display magnification of the expanded display 410 to a value smaller than the display magnification of the retracted display 410 to display the reduced execution screen of the first application on the display 410. In the above-described embodiment, the case in which the display 410 changes from a retracted state to an expanded state has been described as an example. When the display 410 changes from an expanded state to a retracted state, the processor 430 may operate the same as or similar to the above-described embodiment.

According to an embodiment, the processor 430 may determine a display magnification of the display 410 based on a specified input provided to the display 410 by a user. For example, the specified input may be input to the display 410 through a part of a user's body (e.g., finger) or an external input device (not shown) (e.g., a stylus pen).

For example, when a drag input in the first direction is received by the display 410, the processor 430 may maintain the display magnification of the expanded display 410 the same as that of the retracted display 410.

For example, when a drag input in the second direction is received by the display 410, the processor 430 may change the display magnification of the expanded display 410 to be different from that of the retracted display 410. In the above-described embodiment, the case in which the display 410 changes from a retracted state to an expanded state has been described as an example. When the display 410 changes from an expanded state to a retracted state, the processor 430 may operate the same as or similar to the above-described embodiment.

According to an embodiment, the processor 430 may determine a display magnification of the display 410 based on content included in an execution screen displayed on the display 410. For example, when the execution screen displayed on the display 410 includes at least one of text, a table, or a score, the processor 430 may maintain the display magnification of the expanded display 410 the same as the display magnification of the display 410 before the display is expanded (e.g., a retracted state). The processor 430 may identically maintain the display magnification of the expanded display 410 to provide continuous usability to the user using the expanded display 410.

A user of the electronic device 400 according to an embodiment may additionally need an area of the display 410 for the user to input data when inputting data to the display 410. According to an embodiment, when expanding the display 410, the electronic device 400 may determine whether to display a screen on the expanded display 410 at the same display magnification as that of the previously retracted display 410. According to an embodiment, the electronic device 400 may provide continuous usability to the user using the expanded display 410 based on the determined display magnification of the expanded display 410. Hereinafter, operations described as being performed by an electronic device with reference to drawings to be described below may be referred to as being performed by the processor 430.

Figure 5:
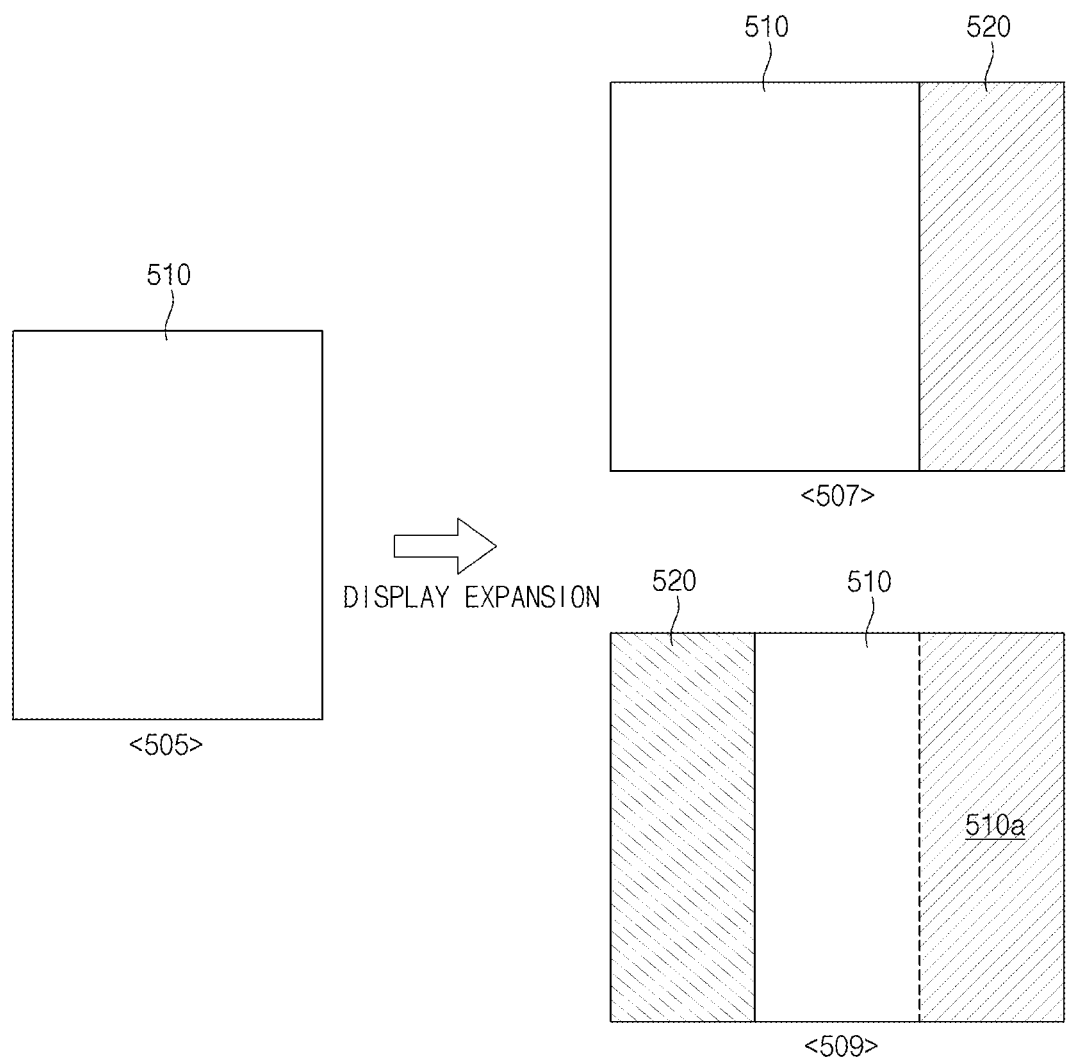
FIG. 5 is a diagram showing a display according to various embodiments.

FIG. 5 is a diagram showing an example display according to various embodiments.

A first example <505> of FIG. 5 shows a retracted display (e.g., display module 160 in FIG. 1 or the display 410 in FIG. 4) (e.g., a display in the first state). A display according to an embodiment may include a first area 510 exposed to the outside in a retracted state.

A second example <507> and a third example <509> of FIG. 5 show an expanded display (e.g., a display in the second state). A display according to an embodiment may include the first area 510 and a second area 520 exposed to the outside in an expanded state. When the display is retracted, the second area 520 may be hidden so as not to be exposed to the outside.

Referring to the second example <507> of FIG. 5, the second area 520 exposed to the outside when the display is expanded may be positioned in one direction (e.g., +x direction) of the first area 510. For example, a left-handed user may expose the second area 520 to the outside by automatically or semi-automatically expanding the display using a driving motor (not shown) when inputting content on the first area 510 shown in the first example <505> of FIG. 5. For example, a right-handed user may expose the second area 520 to the outside by manually expanding the display when inputting content on the first area 510 shown in the first example <505> of FIG. 5. According to an embodiment, when the second area 520 is exposed to the outside in the second example <507> of FIG. 5, the user may additionally use the expanded second area 520.

Referring to the third example <509> of FIG. 5, the second area 520 exposed to the outside when the display is expanded may be positioned in another direction (e.g., −x direction) of the first area 510. For example, a right-handed user may expose the second area 520 to the outside by automatically or semi-automatically expanding the display using a driving motor (not shown) when inputting content on the first area 510 shown in the first example <505> of FIG. 5. For example, a left-handed user may expose the second area 520 to the outside by manually expanding the display when inputting content on the first area 510 shown in the first example <505> of FIG. 5. According to an embodiment, when the second area 520 of the third example <509> of FIG. 5 is exposed to the outside, the electronic device may move the content of an existing screen in another direction (e.g., −x direction), and a user may additionally use a portion 510*a* of the first area 510.

As described above, embodiments described with reference to the following drawings may be applied without being limited to the direction in which the display is expanded or the position of the expanded area of the display.

Figure 6:
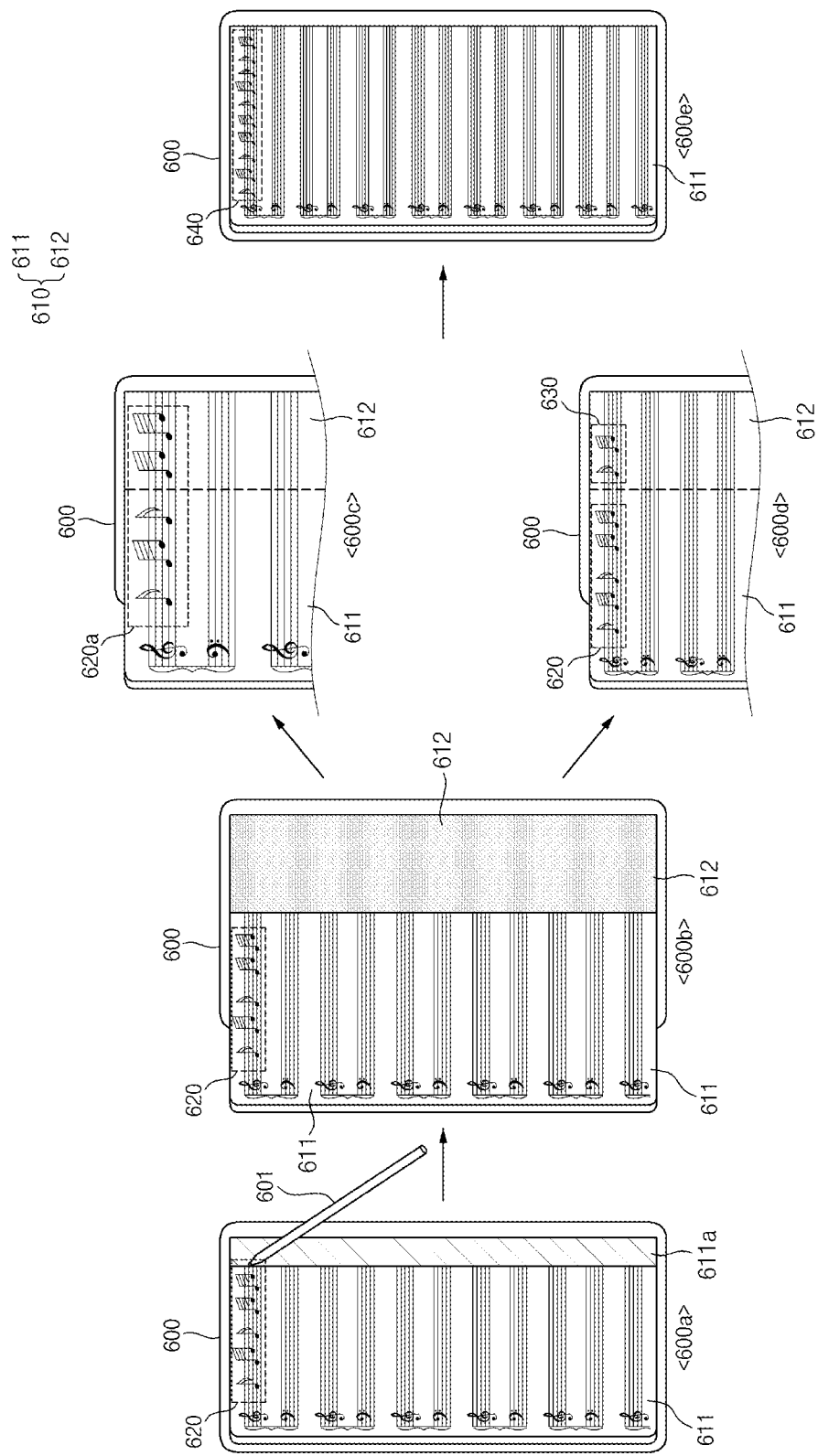
FIG. 6 is a diagram for describing an operation of controlling a display magnification of a display in an example electronic device according to various embodiments.

FIG. 6 is a diagram for describing an example operation of controlling a display magnification of a display in an electronic device according to various embodiments.

Referring to FIG. 6, an electronic device 600 (e.g., the electronic device 101 in FIG. 1 or the electronic device 400 in FIG. 4) may include an expandable and retractable display 610 (e.g., the display module 160 of FIG. 1 or the display 410 of FIG. 4 or the display described with reference to FIG. 5). The display 610 may include a first area 611 and a second area 612. For example, the display 610 may include the first area 611 that is exposed to the outside of the electronic device 600 in a retracted and/or expanded state. For example, the display 610 may include the second area 612 that is not exposed to the outside of the electronic device 600 in a retracted state. For example, the second area 612 may be exposed to the outside of the electronic device 600 when the display 610 has been expanded. According to an embodiment, when the display 610 is expanded or retracted, the electronic device 600 may determine a display magnification of the expanded display 610 (e.g., a display in the second state) or the retracted display 610 (e.g., a display in the first state) based at least in part on information related to an application being executed or content being displayed on the display 610 when the display 610 is expanded or retracted.

Referring to FIG. 6, the electronic device 600 may include the retracted display 610. For example, the retracted display 610 or the electronic device 600 having the retracted display 610 may be in a first state <600a>. For example, the electronic device 600 may display an execution screen of an application being executed on the first area 611 of the display 610 at a first magnification value (or a reference magnification value). The electronic device 600 may display first user content 620, which is input through the user and/or an external input device 601, on at least a portion of the first area 611. According to an embodiment, the electronic device 600 may recognize a specified input applied to a specified area 611a of the first area 611. For example, the electronic device 600 may recognize at least one of a physical key-based input, a touch input, a long press input or an input of a specified pattern (e.g., a knock), which is input to the specified area 611a through the user and/or the external input device 601. According to an embodiment, the electronic device 600 may expand the display 610 based on the specified input which is recognized. For example, the electronic device 600 may automatically expand the display 610 using a driving motor (not shown) based on the specified input. For example, the electronic device 600 may manually expand the display 610 by a force from the user.

Referring to FIG. 6, the electronic device 600 may expand the display 610. For example, when the display 610 is expanded, the first area 611 and the second area 612 may be exposed to the outside of the electronic device 600. For example, the expanded display 610 or the electronic device 600 having the expanded display 610 may be in a second state <600b>. For example, the electronic device 600 may display an execution screen of an application being executed on the first area 611 and the second area 612 of the display 610. According to an embodiment, the electronic device 600 may determine whether to maintain the display magnification of the expanded display 610 the same as the first magnification value based on the type of first user content 620.

Referring to FIG. 6, there is shown an example <600c> in which the electronic device 600 may change the display magnification of the expanded display 610 to a second magnification value different from the first magnification value when the first user content 620 corresponds to drawings. According to an embodiment, the electronic device 600 may display an execution screen of an application being executed on the display 610 based on the changed second magnification value. For example, the electronic device 600 may enlarge an execution screen of an application being executed based on the second magnification value and display the enlarged execution screen on the display 610. For example, the electronic device 600 may enlarge the first user content 620 based on the second magnification value and display an enlarged first user content 620a on the display 610. In various embodiments, the electronic device 600 may display, on the display 610, a user interface (not shown) configured to select whether to maintain the display magnification of the expanded display 610 when the first user content 620 corresponds to drawings. The user interface will be described with reference to FIG. 8 to be described below.

Referring to FIG. 6, there is shown an example 600d in which the electronic device 600 may maintain the display magnification of the expanded display 610 identical to the first magnification value when the first user content 620 corresponds to at least one of text, a table, or a score. For example, the electronic device 600 may display an execution screen of an application being executed on the expanded display 610 at a first magnification value. For example, to maintain the display magnification of the execution screen of the application being executed identical to the display magnification (e.g., the first magnification value) before the display 610 is expanded, the electronic device 600 may load a new template of the application being executed and display the loaded template on the second area 612 of the expanded display 610. For example, the electronic device 600 may display the first user content 620 on the expanded display 610 at the first magnification value. According to an embodiment, the electronic device 600 may expand the display 610 while maintaining the same magnification value as the display magnification of the retracted display 610 (e.g., the first magnification value) and additionally provide the second area 612 to the user. The electronic device 600 may receive second user content 630 using the user and/or the external input device 601 via the expanded display 610. Referring to an example 600d of FIG. 6, the second user content 630 may be displayed on the display 610 at the same magnification value (e.g., the first magnification value) as the display magnification of the retracted display 610 of the electronic device 600 in the first state <600a>. According to an embodiment, the electronic device 600 may display the second user content 630 on a newly loaded template of an application being executed.

According to an embodiment, the electronic device 600 may provide the user with the second area 612 which is expanded while the display magnification is being identically maintained. For example, there may occur a case in which a space for inputting additional data (e.g., the second user content 630) is insufficient when the user is inputting data (e.g., the first user content 620). According to an embodiment, the electronic device 600 may provide the user with the second area 612 which is expanded while the display magnification is being maintained such that the user is able to continuously input additional data.

Referring to FIG. 6, the electronic device 600 may have a state <600e> in which the display 610 is retracted. According to an embodiment, the electronic device 600 may set the display magnification of the retracted display 610 to a display magnification different from the display magnification of the expanded display 610. For example, when changing the display magnification of the retracted display 610, the electronic device 600 may display the second user content 630, which had been displayed on the second area 612 of the expanded display 610, on the retracted display 610. For example, when the first user content 620 or the second user content 630 corresponds to at least one of text, a table, or a score, the electronic device 600 may display an entire user content 640 on the retracted display 610 after changing the display magnification of the display 610. For example, the entire user content 640 may be content obtained by reducing the first user content 620 and the second user content 630 according to the display magnification of the retracted display 610. For example, the electronic device 600 may generate entire user content 640 by reducing the first user content 620 and the second user content 630 according to the display magnification of the retracted display 610. For example, the electronic device 600 may display the entire user content 640 on the retracted display 610 (or the first area 611) at a third magnification value different from the first magnification value. According to various embodiments, the electronic device 600 may provide a user interface (not shown) configured to select whether to maintain the display magnification when the display 610 is retracted. According to various embodiments, the electronic device 600 may set the display magnification of the retracted display 610 to be the same as that of the expanded display 610.

Figure 7:
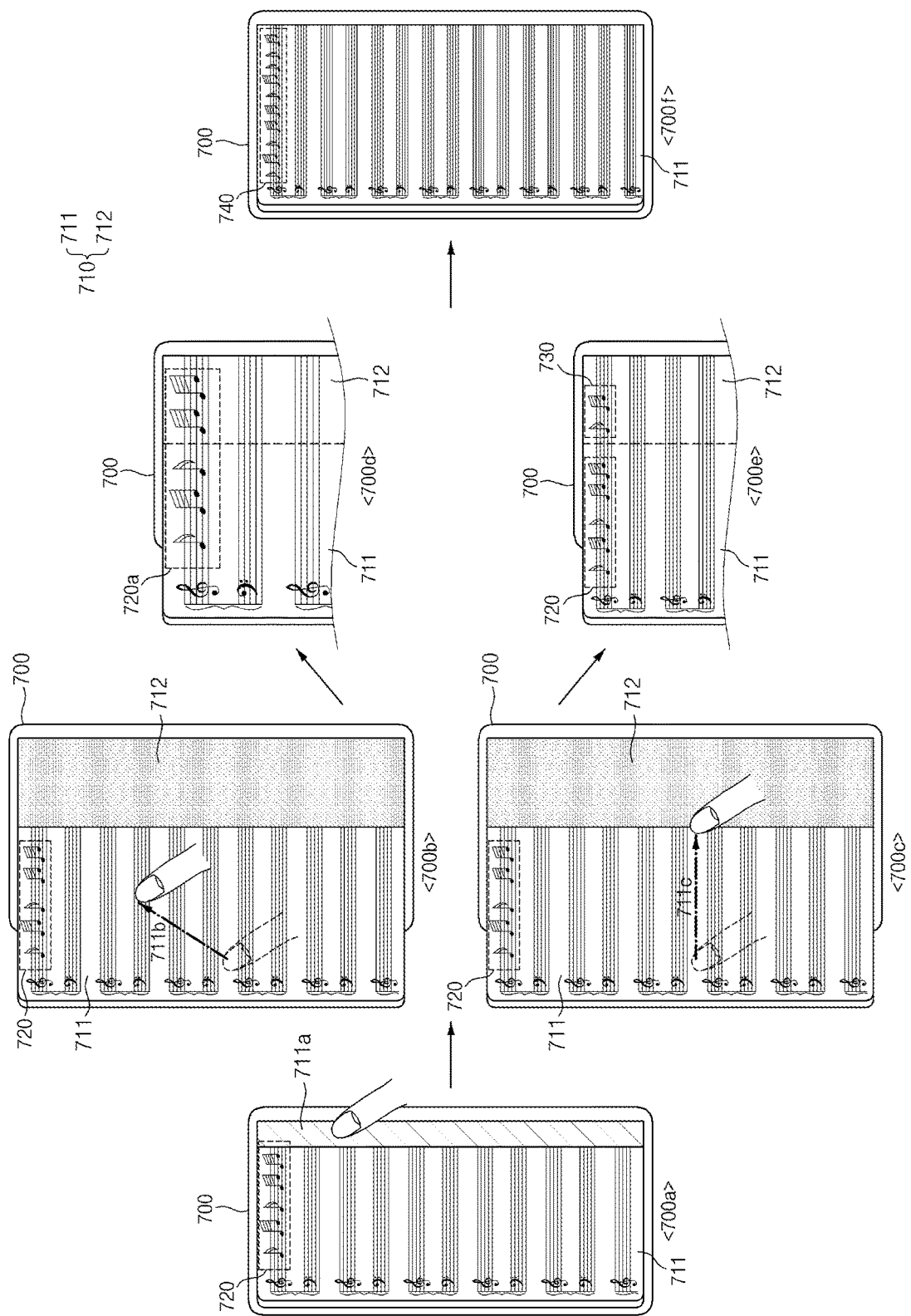
FIG. 7 is a diagram for describing an operation of controlling a display magnification of a display in an example electronic device according to various embodiments.

FIG. 7 is a diagram for describing an example operation of controlling a display magnification of a display in an example electronic device according to various embodiments.

Referring to FIG. 7, an electronic device 700 (e.g., the electronic device 101 in FIG. 1, the electronic device 400 in FIG. 4 or the electronic device 600 in FIG. 6) may include an expandable and retractable display 710 (e.g., the display module 160 of FIG. 1 or the display 410 of FIG. 4, the display described with reference to FIG. 5, or the display 610 of FIG. 6). The display 710 may include a first area 711 and a second area 712. For example, the display 710 may include the first area 711 exposed to the outside of the electronic device 700 in a retracted and/or expanded state. For example, the display 710 may include the second area 712 that is not exposed to the outside of the electronic device 700 in a retracted state. For example, the second area 712 may be exposed to the outside of the electronic device 700 when the display 710 has been expanded. According to an embodiment, when the display 710 is expanded or retracted, the electronic device 700 may determine a display magnification of the expanded display 710 (e.g., a display in the second state) or the retracted display 710 (e.g., a display in the first state) based on a specified user input.

Referring to FIG. 7, the electronic device 700 may be in a first state <700a> including the retracted display 710. For example, the electronic device 700 may display an execution screen of an application being executed on the first area 711 at a first magnification value (or a reference magnification value). According to an embodiment, the electronic device 700 may display first user content 720, which is input through a user and/or an external input device (not shown), on at least a portion of the first area 711. According to an embodiment, the electronic device 700 may recognize an input based on a specified input (e.g., a physical key), a touch input, a long press input, or an input of a specified pattern (e.g., a knock), which is applied to a specified area 711a of the first area 711.

According to an embodiment, the electronic device 700 may expand the display 710 based on the specified input which is recognized. For example, the electronic device 700 may automatically expand the display 710 using a driving motor (not shown) or may expand the display 710 by a force from the user, based on the specified input.

For example, the user of the electronic device 700 may provide a touch input to the specified area 711a to input the first user content 720 into the specified area 711a while inputting the first user content 720 into the first area 711. For example, when the user of the electronic device 700 is inputting text or drawings by touching the first area 711 with a hand, the user may contact an end of the first area 711 (e.g., the specified area 711a) to continuously input text or drawings with the user's hand. In various embodiments, when the user of the electronic device 700 is inputting text or drawings by touching the first area 711 with an external input device (not shown) (the external input device 601 of FIG. 6), the user may provide an input (e.g., a touch input) using the external input device to an end of the first area 711 (e.g., the specified area 711a) to continuously input text or drawings. According to an embodiment, the electronic device 700 may detect an input by a user's hand or an external input device applied to one end of the first area 711 (e.g., the specified area 711a).

According to an embodiment, when the electronic device 700 detects that an input by the user's hand or the external input device is input to one end of the first area 711 (e.g., the specified area 711a), the electronic device 700 may recognize that the user has intention to continuously input text or drawings. According to an embodiment, when the input of the first user content 720 continues (or is continuous) to one end of the first area 711 (e.g., the specified area 711a), the electronic device 700 may recognize that the user has intention to continuously (sequentially) input the first user content 720. In this case, the electronic device 700 may automatically expand the display 710 using a driving motor (not shown).

Referring to FIG. 7, the electronic device 700 may be in a second state <700b> or <700c> including the expanded display 710. Referring to FIG. 7, the electronic device 700 may detect a specified user input. For example, the electronic device 700 may detect a drag input (or a swipe) in a first direction 711b on the display 710. For example, the electronic device 700 may detect a drag input (or swipe) in a second direction 711c on the display 710.

Referring to FIG. 7, there is shown an example in which the electronic device 700 changes the display magnification of the expanded display 710 to a second magnification value different from a first magnification value based on detecting a drag input (or a swipe) in the first direction 711b. According to an embodiment, the electronic device 700 may display an execution screen of an application being executed on the display 710 based on the changed second magnification value. For example, the electronic device 700 may enlarge an execution screen of an application being executed based on the second magnification value and display the enlarged execution screen on the display 710 in state <700d>. For example, the electronic device 700 may enlarge the first user content 720 based on the second magnification value and display an enlarged first user content 720a on the display 710. In various embodiments, the electronic device 700 may display, on the display 710, a user interface (not shown) configured to select whether to maintain the display magnification of the expanded display 710. The user interface will be described with reference to FIG. 8 to be described below.

Referring to FIG. 7, there is shown an example in which the electronic device 700 maintains the display magnification of the expanded display 710 the same as a first magnification value based on detecting a drag input (or a swipe)

in the second direction 711c. For example, the electronic device 700 may display an execution screen of an application being executed on the expanded display 710 at a first magnification value in state <700e>. For example, to maintain the display magnification of the execution screen of the application being executed identical to the display magnification (e.g., the first magnification value) before the display 710 is expanded, the electronic device 700 may load a new template of the application being executed and display the loaded template on the second area 712 of the expanded display 710. For example, the electronic device 700 may display the first user content 720, on the expanded display 710 at the first magnification value. According to an embodiment, the electronic device 700 may expand the display 710 while maintaining the same magnification value as the display magnification of the retracted display 710 (e.g., the first magnification value) and additionally provide the second area 712 to the user. According to an embodiment, the electronic device 700 may receive second user content 730 and display the second user content 730 on a newly loaded template of an application being executed.

As described above, the electronic device 700 may provide the user with the second area 712 which is expanded while the display magnification is being maintained such that the user is able to continuously input additional data (e.g., the second user content 730).

According to an embodiment, when it is detected that an input by a user's hand or an external input device is input to one end of the first area 711 (e.g., a specified area 711a) while the user is inputting the first user content 720 (e.g., text or drawings), the electronic device 700 may recognize that the user has intention to continuously (sequentially) input the first user content 720 (e.g., text or drawings) and maintain the display magnification of the expanded display 710 the same as the first display magnification value.

Referring to FIG. 7, the electronic device 700 may have a state <700f> in which the display 710 is retracted. According to an embodiment, the electronic device 700 may determine whether to maintain the display magnification of the retracted display 710 the same as the display magnification of the expanded display 710. For example, the electronic device 700 may maintain the display magnification of the retracted display 710 the same as the display magnification of the expanded display 710 based on a specified user input. For example, the electronic device 700 may change the display magnification of the retracted display 710 to be different from the display magnification of the expanded display 710 based on a specified user input and display an entire user content 740 on the retracted display 710. For example, the electronic device 700 may generate the entire user content 740 by reducing the first user content 720 and the second user content 730 according to the display magnification of the retracted display 710. For example, the electronic device 700 may display the first entire user content 740 on the retracted display 710 (or the first area 711) at a third magnification value different from the first magnification value. For example, the electronic device 700 may provide a user interface (not shown) configured to select whether to maintain the display magnification when the display 710 is retracted.

Figure 8:
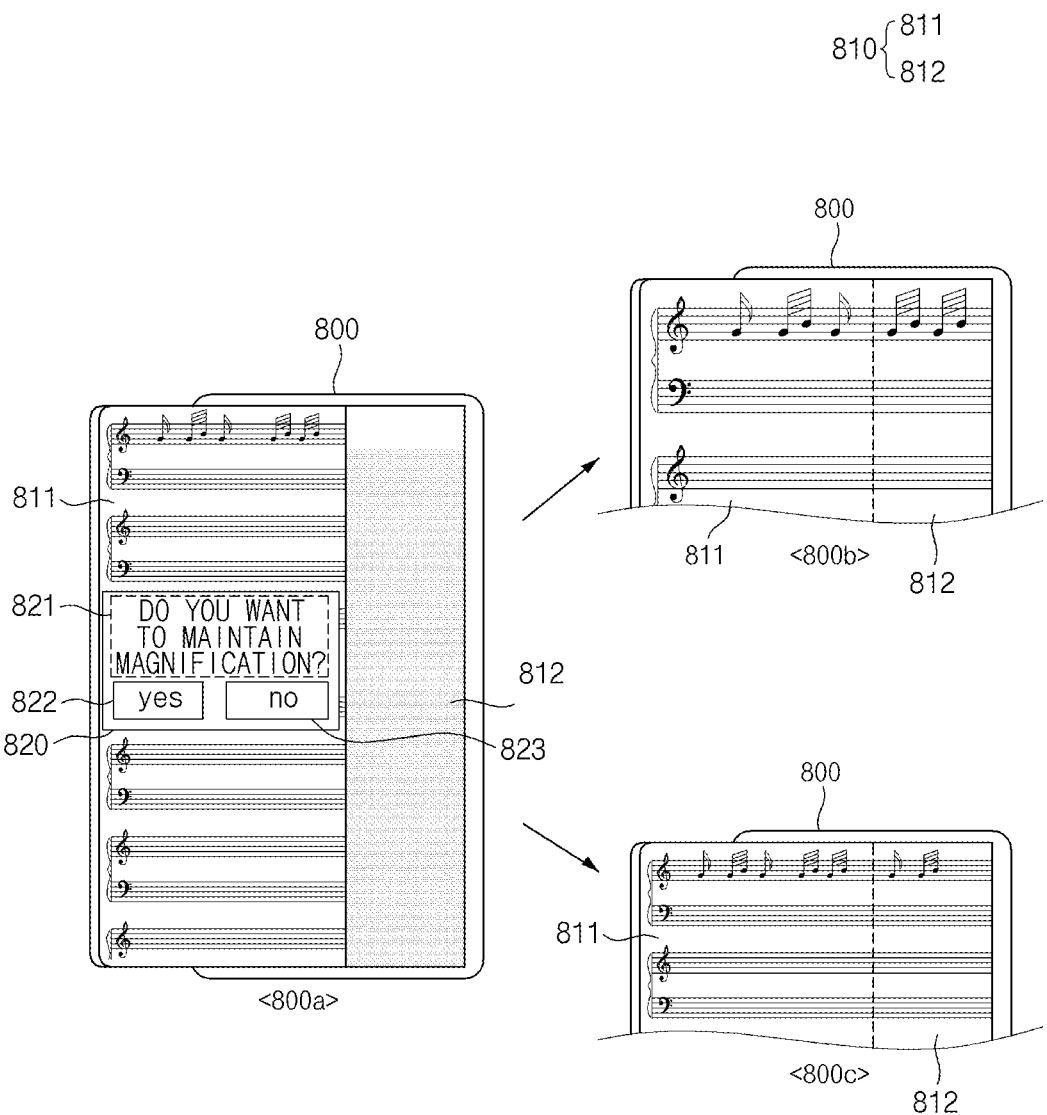
FIG. 8 is a diagram showing an example of a user interface configured to set a display magnification of a display, according to various embodiments.

FIG. 8 is a diagram showing an example of a user interface configured to set a display magnification of a display, according to various embodiments.

Referring to FIG. 8, an electronic device 800 (e.g., the electronic device 101 in FIG. 1, the electronic device 400 in FIG. 4, the electronic device 600 in FIG. 6, or the electronic device 700 in FIG. 7) may include an expandable and retractable display 810 (e.g., the display module 160 of FIG. 1 or the display 410 of FIG. 4, the display described with reference to FIG. 5, the display 610 of FIG. 6, or the display 710 in FIG. 7). According to an embodiment, the display 810 may include a first area 811 visually exposed to a user in an expanded state and a retracted state. According to an embodiment, the display 810 may include a second area 812 that is not visually exposed to the user when the display 810 is retracted and is visually exposed to the user when the display 810 is expanded.

Referring to FIG. 8, the electronic device 800 may be in a state <800a> including the expanded display 810. When the display 810 is expanded, the electronic device 800 may display a user interface 820 for setting a display magnification of the expanded display 810 (e.g., a display in the second state) on the expanded display 810. In various embodiments, the electronic device 800 may display the user interface 820 on the retracted display 810 (e.g., the display in the first state) in a retracted state before the display 810 is expanded. According to an embodiment, the electronic device 800 may request a user to select whether to maintain the display magnification of the expanded display 810 the same as that of the retracted display through the user interface 820. According to an embodiment, the user interface 820 may include first information 821 for determining a display magnification of the display 810, a first icon 822, and a second icon 823. For example, the first information 821 may include "Do you want to maintain magnification?". The first information 821 shown in FIG. 8 is merely an example, and is not limited to the shown example.

According to an embodiment, when receiving an input for selecting the first icon 822 (e.g., yes) from the user, the electronic device 800 may maintain the display magnification of the expanded display 810 the same as the display magnification of the retracted display 810 before the display 810 is expanded. For example, an example <800c> of FIG. 8 shows an example of the expanded display 810 having the same magnification value as the display magnification of the retracted display 810.

According to an embodiment, when receiving an input for selecting the second icon 823 (e.g., no) from the user, the electronic device 800 may set the display magnification of the expanded display 810 to a value different from the display magnification of the retracted display 810 before the display 810 is expanded. For example, the electronic device 800 may enlarge and display the execution screen of an application being executed on the expanded display 810 by changing the display magnification of the expanded display 810. For example, an example <800b> of FIG. 8 shows an example of the expanded display 810 having the magnification value different from the display magnification of the retracted display 810. Referring to the example <800b> of FIG. 8, the electronic device 800 may enlarge an execution screen of an application being executed to display the expanded display 810.

According to an embodiment, the electronic device 800 may retract the expanded display 810 again. According to an embodiment, the electronic device 800 may provide a user interface (not shown) for setting a display magnification of the retracted display 810. For example, the electronic device 800 may request the user to select whether to maintain the display magnification of the retracted display 810 the same as the display magnification of the expanded display 810 before the display 810 is retracted, via a user interface (not shown). The user interface (not shown) for setting the display magnification of the retracted display may be configured the same as or similar to the user interface 820 shown in FIG. 8. According to an embodiment, to maintain the display magnification of the execution screen of the application being executed identical to the display magnification (e.g., the first magnification value) before the display 810 is expanded, the electronic device 800 may load a new template of the application being executed and display the loaded template on the second area 812 of the expanded display 810.

Figure 9:
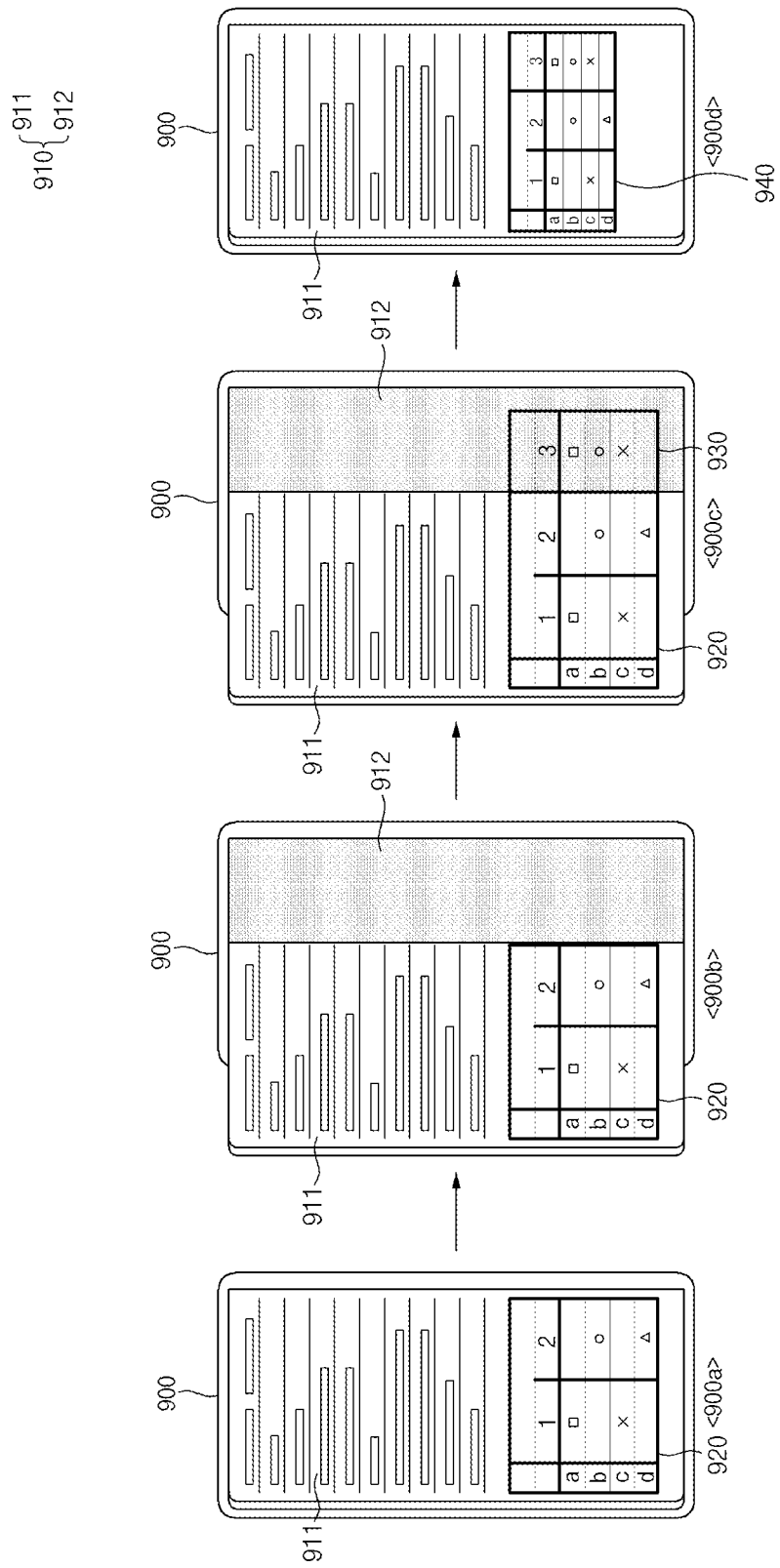
FIG. 9 is a diagram for describing an operation of controlling a display magnification of a display in an example electronic device according to various embodiments.

FIG. 9 is a diagram for describing an example operation of controlling a display magnification of a display in an example electronic device according to various embodiments.

Referring to FIG. 9, an electronic device 900 (e.g., the electronic device 101 in FIG. 1, the electronic device 400 in FIG. 4, the electronic device 600 in FIG. 6, the electronic device 700 in FIG. 7 or the electronic device 800 in FIG. 8) may include an expandable and retractable display 910 (e.g., the display module 160 of FIG. 1 or the display 410 of FIG. 4, the display described with reference to FIG. 5, the display 610 of FIG. 6, or the display 710 in FIG. 7, or the display 810 in FIG. 8). The display 910 may include a first area 911 and a second area 912. For example, the display 910 may include the first area 911 exposed to the outside of the electronic device 900 in a retracted and/or expanded state. For example, the display 910 may include the second area 912 that is not exposed to the outside of the electronic device 900 in a retracted state.

Referring to FIG. 9, the electronic device 900 may include the retracted display 910 (e.g., the display in the first state). For example, the electronic device 900 may display an execution screen of an application being executed on the first area 911 at a first magnification value (or a reference magnification value) in state <900a>. According to an embodiment, the electronic device 900 may display first user content 920, which is input through a user and/or an external input device (not shown), on at least a portion of the first area 911. According to an embodiment, the electronic device 900 may recognize that the first user content 920 includes a table.

Referring to FIG. 9, the electronic device 900 may expand the display 910 in state <900b>. For example, the electronic device 900 may recognize an input based on a specified input (e.g., a physical key), a touch input, a long press input, or an input of a specified pattern (e.g., a knock), which is applied to a specified area (not shown) of the first area 911. For example, the electronic device 900 may expand the display 910 based on a specified input. According to an embodiment, the electronic device 900 may determine whether to maintain the display magnification of the expanded display 910 (e.g., the display in the second state) the same as the first magnification value based on the type of first user content 920 when expanding the display 910.

Referring to FIG. 9, the electronic device 900 may expand the display 910 to expose the first area 911 and the second area 912 to the outside of the electronic device 900. According to an embodiment, when recognizing that the first user content 920 includes a table, the electronic device 900 may maintain the display magnification of the expanded display 910 the same as the display magnification of the retracted display 910 before the display 810 is expanded. For example, the electronic device 900 may expand the display 910 while maintaining the same magnification value as the display magnification of the retracted display 910 (e.g., the first magnification value) and additionally provide the second area 912 to the user.

According to an embodiment, when the display 910 is expanded while the user is creating a table, the electronic device 900 may determine that the user has intention to input additional data having continuity and/or relevance to the table being created. According to an embodiment, the electronic device 900 may maintain the display magnification of the display 910 when the display 910 is expanded, based on the table input by the user without changing the display magnification. According to an embodiment, the electronic device 900 may provide the user with the second area 912 which is expanded while the display magnification is being maintained such that the user is able to continuously input additional data in state <900c>.

According to an embodiment, the electronic device 900 may receive second user content 930 (e.g., content related to the first content 920) from the user, and display the received second user content 930 on at least a portion (e.g., the second area 912) of the expanded display 910 at the same magnification value as the display magnification of the retracted display 910 (e.g., a first magnification value).

Referring to FIG. 9, the electronic device 900 may retract the display 910 in state <900d>. According to an embodiment, the electronic device 900 may set the display magnification of the retracted display 910 to a display magnification different from the display magnification of the expanded display 910. For example, the electronic device 900 may recognize that the first user content 920 or the second user content 930 includes a table. For example, the electronic device 900 may change the display magnification of the retracted display 910 based on the first user content 920 or the second user content 930 including the table. For example electronic device 900 may generate entire user content 940 by reducing the first user content 920 and the second user content 930 according to the display magnification of the retracted display 910. For example, the electronic device 900 may display the generated entire user content 940 on the retracted display 910 (or the first area 911) at a third magnification value different from the first magnification value. According to various embodiments, the electronic device 900 may provide a user interface (not shown) configured to select whether to maintain the display magnification when the display 910 is retracted.

Figure 10:
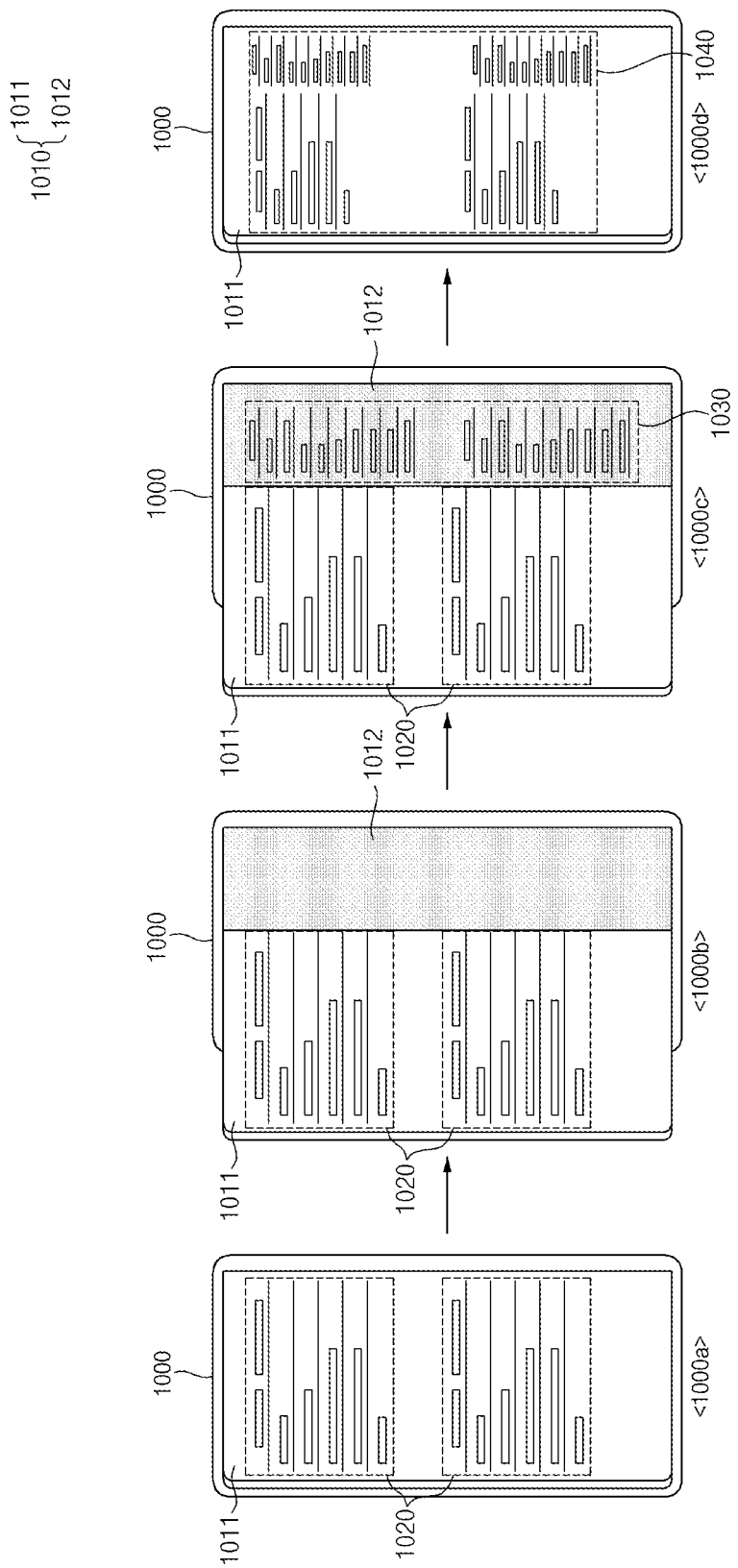
FIG. 10 is a diagram for describing that an example electronic device displays additional content on an expanded display while maintaining a property of previously input content, according to various embodiments.

FIG. 10 is a diagram for describing that an example electronic device displays additional content on an expanded display while maintaining a property of previously input content, according to various embodiments.

Referring to FIG. 10, an electronic device 1000 (e.g., the electronic device 101 in FIG. 1, the electronic device 400 in FIG. 4, the electronic device 600 in FIG. 6, the electronic device 700 in FIG. 7, the electronic device 800 in FIG. 8, or the electronic device 900 in FIG. 9) may include an expandable and retractable display 1010 (e.g., the display module 160 of FIG. 1 or the display 410 of FIG. 4, the display described with reference to FIG. 5, the display 610 of FIG. 6, or the display 710 in FIG. 7, the display 810 in FIG. 8, or the display 910 in FIG. 9). The display 1010 may include a first area 1011 and a second area 1012. For example, the display 1010 may include the first area 1011 exposed to the outside of the electronic device 1000 in a retracted and/or expanded state. For example, the display 1010 may include the second area 1012 that is not exposed to the outside of the electronic device 1000 in a retracted state.

Referring to FIG. 10, the electronic device 1000 may include a retracted display 1010 (e.g., a display in the first state). For example, the electronic device 1000 may display an execution screen of an application being executed on the first area 1011 at a first magnification value (or a reference magnification value) in state <1000a>. According to an embodiment, the electronic device 1000 may display first user content 1020, which is input through a user and/or an external input device (not shown), on at least a portion of the first area 1011.

Referring to FIG. 10, the electronic device 1000 may expand the display 1010. For example, the electronic device 1000 may expand the display 1010 based on a specified input. For example, when the display 1010 is expanded, the electronic device 1000 may expose the first area 1011 and the second area 1012 to the outside of the electronic device 1000 in a state <1000b>.

Referring to FIG. 10, the electronic device 1000 may maintain a display magnification of an expanded display 1010 (e.g., a display in the second state) the same as the display magnification (e.g., a first magnification value) of the retracted display 1010. According to an embodiment, the electronic device 1000 may receive second user content 1030 from a user and/or an external input device (not shown) in state <1000c>.

According to an embodiment, the electronic device 1000 may determine a relevance between the first user content 1020 and the second user content 1030. According to an embodiment, when the electronic device 1000 determines that the second user content 1030 is related to the first user content 1020, the electronic device 1000 may set a display property of the second user content 1030 to be at least partially the same as the display property of the first user content 1020. For example, the display property may include at least one of line thickness, line type, line color, and font type. For example, the electronic device 1000 may display, on the display 1010, the first user content 1020 with display properties including a first thickness (e.g., 1 mm), a first type (e.g., solid line), and a first color (e.g., blue). When it is determined that the second user content 1030 is related to the first user content 1020, the electronic device 1000 may display, on the display 1010, the second user content 1030 to have the same display properties as the display properties of the first user content 1020. For example, the electronic device 1000 may display, on the display 1010, the second user content 1030 with display properties including a first thickness (e.g., 1 mm), a first type (e.g., solid line), and a first color (e.g., blue). According to an embodiment, the electronic device 1000 may determine that the second user content 1030 is not related to the first user content 1020. For example, the electronic device 1000 may determine that the second user content 1030 has a relatively low relevance to the first user content 1020. When it is determined that the second user content 1030 is not related to the first user content 1020, the electronic device 1000 may set the display properties of the second user content 1030 at least partially differently from the display properties of the first user content 1020. For example, the electronic device 1000 may display, on the display 1010, the first user content 1020 with display properties including a first thickness (e.g., 1 mm), a first type (e.g., solid line), and a first color (e.g., blue). The electronic device 1000 may display, on the display 1010, the second user content 1030 with display properties including a second thickness (e.g., 3 mm), a second type (e.g., dotted line), and a first color (e.g., blue), based on the determination that the second user content 1030 is not related to the first user content 1020. In various embodiments, when it is determined that the second user content 1030 is not related to the first user content 1020, the electronic device 1000 may provide a user with a user interface configured to set display properties of the second user content 1030.

Referring to FIG. 10, the electronic device 1000 may retract the display 1010 in state <1000d>. According to an embodiment, the electronic device 1000 may set the display magnification of the retracted display 1010 differently from the display magnification of the expanded display 1010. For example, the electronic device 1000 may generate third user content 1040 by reducing the first user content 1020 and the second user content 1030 according to the display magnification of the retracted display 1010. The electronic device 1000 may display the generated third user content 1040 on the retracted display 1010 (or the first area 1011).

Figure 11:
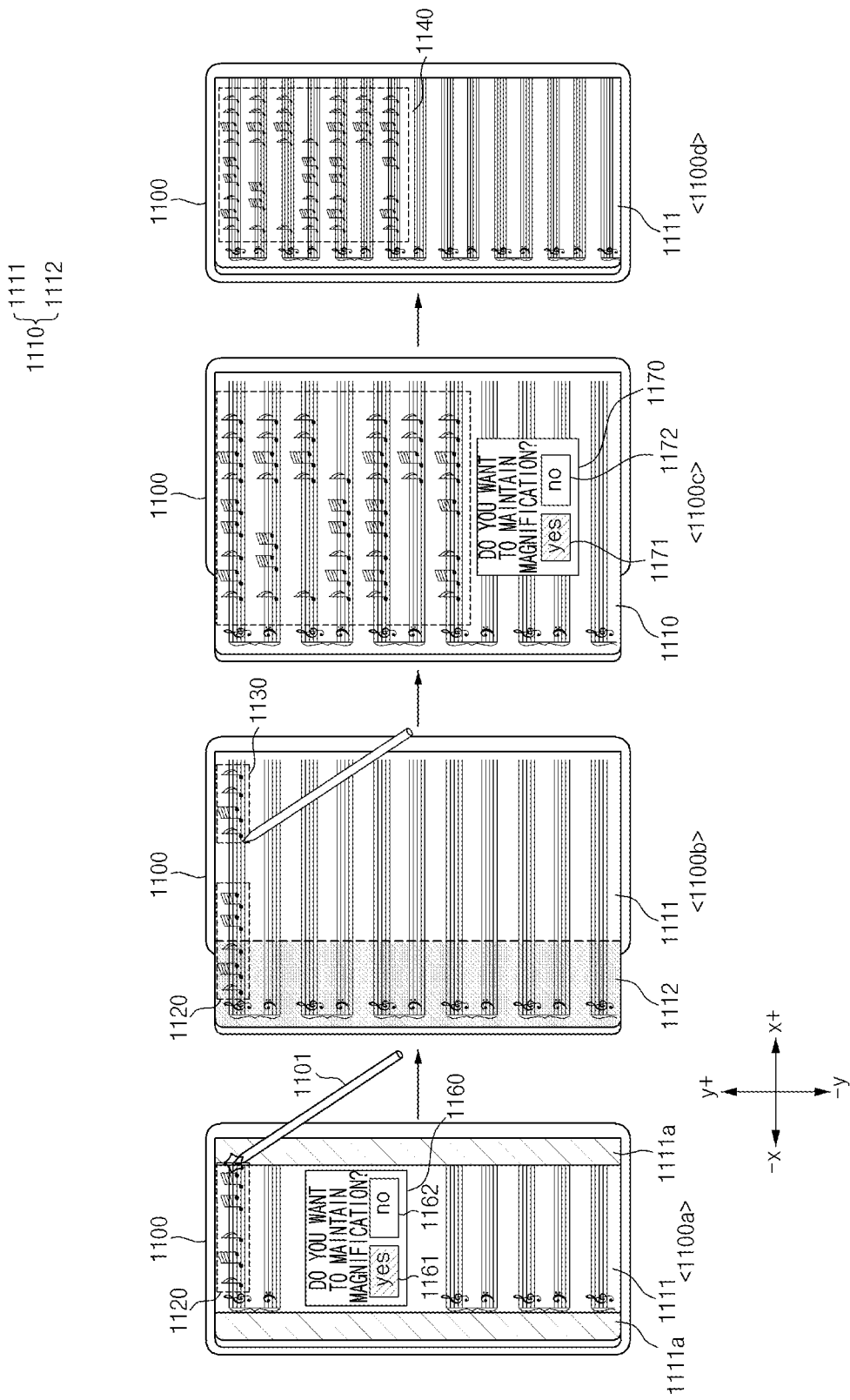
FIG. 11 is a diagram for describing an operation of setting a display magnification of a display in an example electronic device according to various embodiments.

FIG. 11 is a diagram for describing an example operation of setting a display magnification of a display in an electronic device according to various embodiments.

Referring to FIG. 11, an electronic device 1100 (e.g., the electronic device 101 in FIG. 1, the electronic device 400 in FIG. 4, the electronic device 600 in FIG. 6, the electronic device 700 in FIG. 7, the electronic device 800 in FIG. 8, the electronic device 900 in FIG. 9, or the electronic device 1000 in FIG. 10) may include an expandable and retractable display 1110 (e.g., the display module 160 of FIG. 1 or the display 410 of FIG. 4, the display described with reference to FIG. 5, the display 610 of FIG. 6, or the display 710 in FIG. 7, the display 810 in FIG. 8, the display 910 in FIG. 9, or the display 1010 in FIG. 10). The display 1110 may include a first area 1111 and a second area 1112. For example, the display 1110 may include the first area 1111 exposed to the outside of the electronic device 1100 in a retracted and/or expanded state. For example, the display 1110 may include the second area 1112 that is not exposed to the outside of the electronic device 1100 in a retracted state.

Referring to FIG. 11, the electronic device 1100 may include a retracted display 1110 (e.g., a display in the first state). For example, the electronic device 1100 may display an execution screen of an application being executed on the first area 1111 at a first magnification value (or a reference magnification value) in a state <1100a>. According to an embodiment, the electronic device 1100 may display first user content 1120, which is input through a user and/or an external input device 1101, on at least a portion of the first area 1111. According to an embodiment, the electronic device 1100 may recognize a specified input applied to a pre-specified area 1111a. For example, the electronic device 1100 may recognize at least one of a physical key-based input, a touch input, a long press input or an input of a specified pattern (e.g., a knock), which is applied to the pre-specified area 1111a. Although the pre-specified area 1111a is illustrated as being located at both opposite ends of the first area 1111 in FIG. 11, the number or location of the pre-specified areas 1111 is not limited in this respect.

According to an embodiment, the electronic device 1100 may display, on the display 1010 (or the retracted display 1110), a first user interface 1160 configured to select whether to maintain the display magnification of the expanded display 1110 (e.g., the display in the second state), based on the specified input applied to the pre-specified area 1111a. For example, the first user interface 1160 may include first information for determining a display magnification of the expanded display 1110, a first icon 1161 (e.g., yes), and a second icon 1162 (e.g., no). For example, the first information may include "Do you want to maintain magnification?". The first user interface 1160 shown in FIG. 11 is merely an example, and the disclosure is not limited to the shown example. According to an embodiment, the electronic device

1100 may receive an input for selecting the first icon 1161 (e.g., yes) through a user and/or the external input device 1101.

Referring to FIG. 11, the electronic device 1100 may expand the display 1110. For example, the electronic device 1100 may expand the display 1110 based on an input for selecting the first icon 1161 (e.g., yes). In an embodiment, the electronic device 1100 may expand the display 1110 to expose the first area 1111 and the second area 1112 to the outside of the electronic device 1100. According to an embodiment, the electronic device 1100 may maintain the display magnification of the expanded display 1010 at a first display magnification to display an execution screen of an application. For example, to maintain the display magnification of the execution screen of the application being executed identical one of display magnification (e.g., the first magnification value) before the display 1110 is expanded, the electronic device 1100 may load a new template of the application being executed and display the loaded template on one of the first area 1111 and the second area 1112 of the expanded display 1110. For example, when the second area 1112 is located in the first direction of the first area 1111 (e.g., the −x direction or the left direction in FIG. 11), the electronic device 1100 may move at least a portion of the execution screen displayed on the retracted display 1110 to the second area 1112 of the expanded display 1110. According to an embodiment, the electronic device 1100 may receive second user content 1130 from a user and/or the external input device 1101. The electronic device 1100 may display second user content 1130 on at least a portion of the expanded display 1110 in state <1100*b*>.

Referring to FIG. 11, the electronic device 1100 may display, on the display 1110 (or the expanded display 1110) in state <1100*c*>, a second user interface 1170 configured to select whether to maintain a display magnification when retracting the display 1110 based on a specified input. For example, the second user interface 1170 may be configured the same as or similar to the first user interface 1160. For example, the second user interface 1170 may include second information for determining a display magnification of the retracted display 1110, a third icon 1171 (e.g., yes), and a fourth icon 1172 (e.g., no). According to an embodiment, the electronic device 1100 may receive an input for selecting the fourth icon 1172 (e.g., no) through a user and/or the external input device 1101.

Referring to FIG. 11, the electronic device 1100 may retract the display 1110 based on a user input for selecting the fourth icon 1172. The electronic device 1100 may change the display magnification of the retracted display 1110 differently from the display magnification of the expanded display 1110 based on a user input for selecting the fourth icon 1172. According to an embodiment, the electronic device 1100 may generate third user content 1140 as shown in state <1100*d*> by reducing the first user content 1120 and the second user content 1130 displayed on the expanded display 1110 at the display magnification of the retracted display 1110. For example, the electronic device 1100 may display the generated third user content 1140 on the retracted display 1110 (or the first area 1111).

Figure 12:
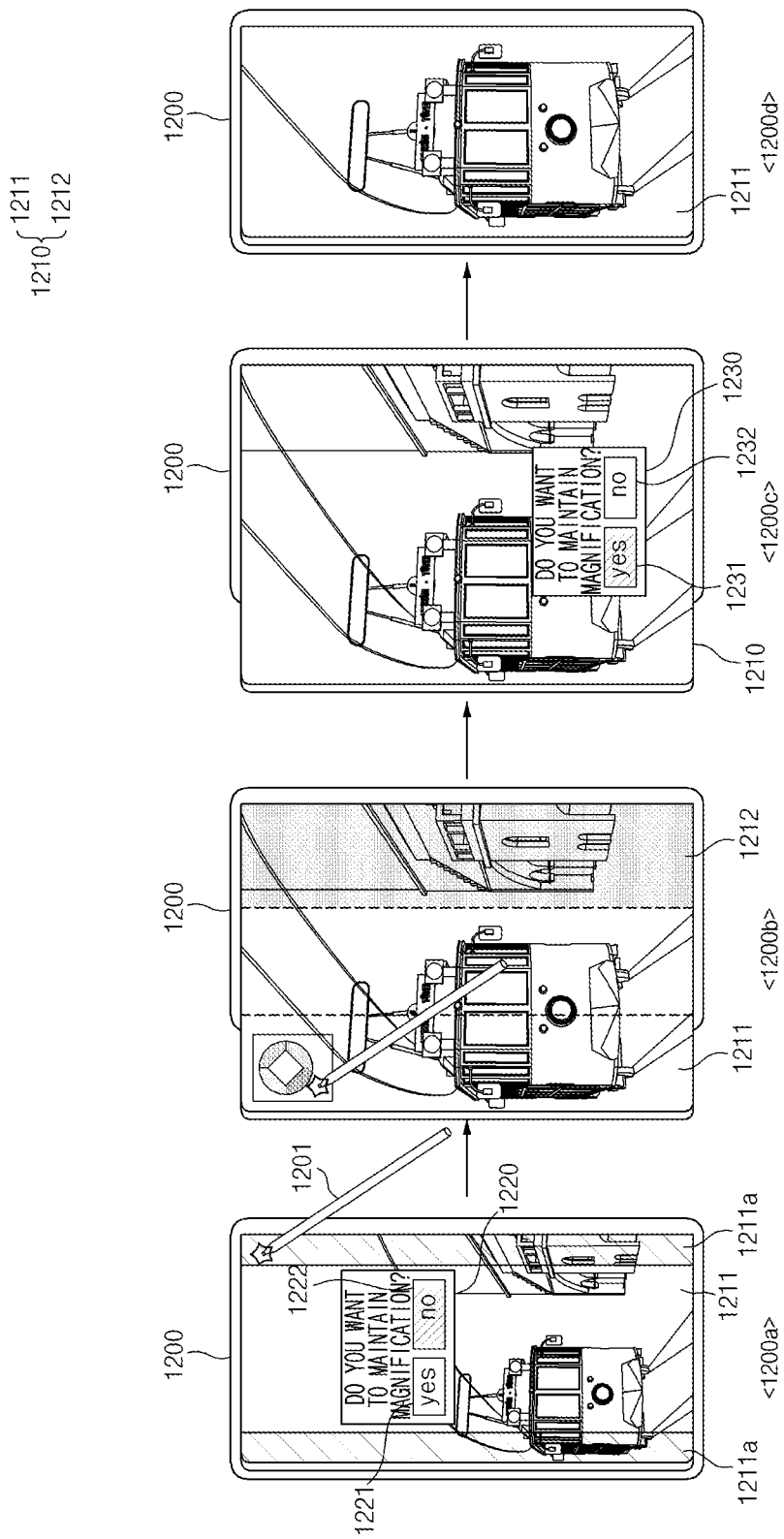
FIG. 12 is a diagram for describing an operation of setting a display magnification of a display in an example electronic device according to various embodiments.

FIG. 12 is a diagram for describing an example operation of setting a display magnification of a display in an example electronic device according to various embodiments.

Referring to FIG. 12, an electronic device 1200 (e.g., the electronic device 101 in FIG. 1, the electronic device 400 in FIG. 4, the electronic device 600 in FIG. 6, the electronic device 700 in FIG. 7, the electronic device 800 in FIG. 8, the electronic device 900 in FIG. 9, the electronic device 1000 in FIG. 10, or the electronic device 1100 in FIG. 11) may include an expandable and retractable display 1210 (e.g., the display module 160 of FIG. 1 or the display 410 of FIG. 4, the display described with reference to FIG. 5, the display 610 of FIG. 6, or the display 710 in FIG. 7, the display 810 in FIG. 8, the display 910 in FIG. 9, the display 1010 in FIG. 10, or the display 1110 in FIG. 11). The display 1210 may include a first area 1211 and a second area 1212. For example, the display 1210 may include the first area 1211 exposed to the outside of the electronic device 1200 in a retracted and/or expanded state. For example, the display 1210 may include the second area 1212 that is not exposed to the outside of the electronic device 1200 in a retracted state. In the following, contents overlapping with the above description are not repeated.

Referring to FIG. 12, the electronic device 1200 may include the retracted display 1210 (e.g., the display in the first state) in state <1200*a*>. For example, the electronic device 1200 may display an execution screen of an application being executed on the first area 1211 at a first magnification value (or a reference magnification value). According to an embodiment, the electronic device 1200 may display, on the display 1210 (or the retracted display 1210), a first user interface 1220 configured to allow selection of whether to maintain the display magnification of the expanded display 1210 (e.g., the display in the second state), based on the specified input applied to a pre-specified area 1211*a*. For example, the first user interface 1220 may include, a first icon 1221 (e.g., yes), and a second icon 1222 (e.g., no). According to an embodiment, the electronic device 1200 may receive an input for selecting the second icon 1222 (e.g., no) through a user and/or an external input device 1201.

Referring to FIG. 12, the electronic device 1200 may expand the display 1210 in state <1200*b*>. For example, the electronic device 1200 may expand the display 1210 based on an input for selecting the second icon 1222. According to an embodiment, the electronic device 1200 may change a display magnification of the expanded display 1210 based on an input for selecting the second icon 1222. According to an embodiment, the electronic device 1200 may display an execution screen of an application based on the changed display magnification. For example, the electronic device 1200 may change the display magnification of the expanded display 1210 to the second magnification value. According to an embodiment, the electronic device 1200 may enlarge an execution screen of an application, displayed at a first magnification value, to a second magnification value, and display the enlarged execution screen of the application on the expanded display 1210.

Referring to FIG. 12, the electronic device 1200 may display, on the display 1210 (or the expanded display 1210), a second user interface 1230 configured to select whether to maintain a display magnification when retracting the display 1210 based on a specified input as in state <1200*c*>. For example, the second user interface 1230 may include a third icon 1231 (e.g., yes), and a fourth icon 1232 (e.g., no). According to an embodiment, the electronic device 1200 may receive an input for selecting the third icon 1231 (e.g., yes) included in the second user interface 1230 through a user and/or an external input device 1201.

Referring to FIG. 12, the electronic device 1200 may retract the display 1210 based on an input for selecting the third icon 1231 (e.g., yes) as in state <1200*d*>. The electronic device 1200 may maintain the display magnification of the retracted display 1210 the same as the display magnification of the expanded display 1210 based on a user input for selecting the third icon 1231 (e.g., yes). For example, the electronic device 1200 may display the execution screen of an application while maintaining the display magnification of the retracted display 1210 the at the same magnification as the display magnification (e.g., the second magnification value) of the expanded display 1210. According to an embodiment, the electronic device 1200 may set the display magnification of the expanded display 1210 and the display magnification of the retracted display 1210 to be the same, so that at least a portion of the execution screen of the application displayed on the expanded display 1210 may not be displayed on the retracted display 1210.

Figure 13:
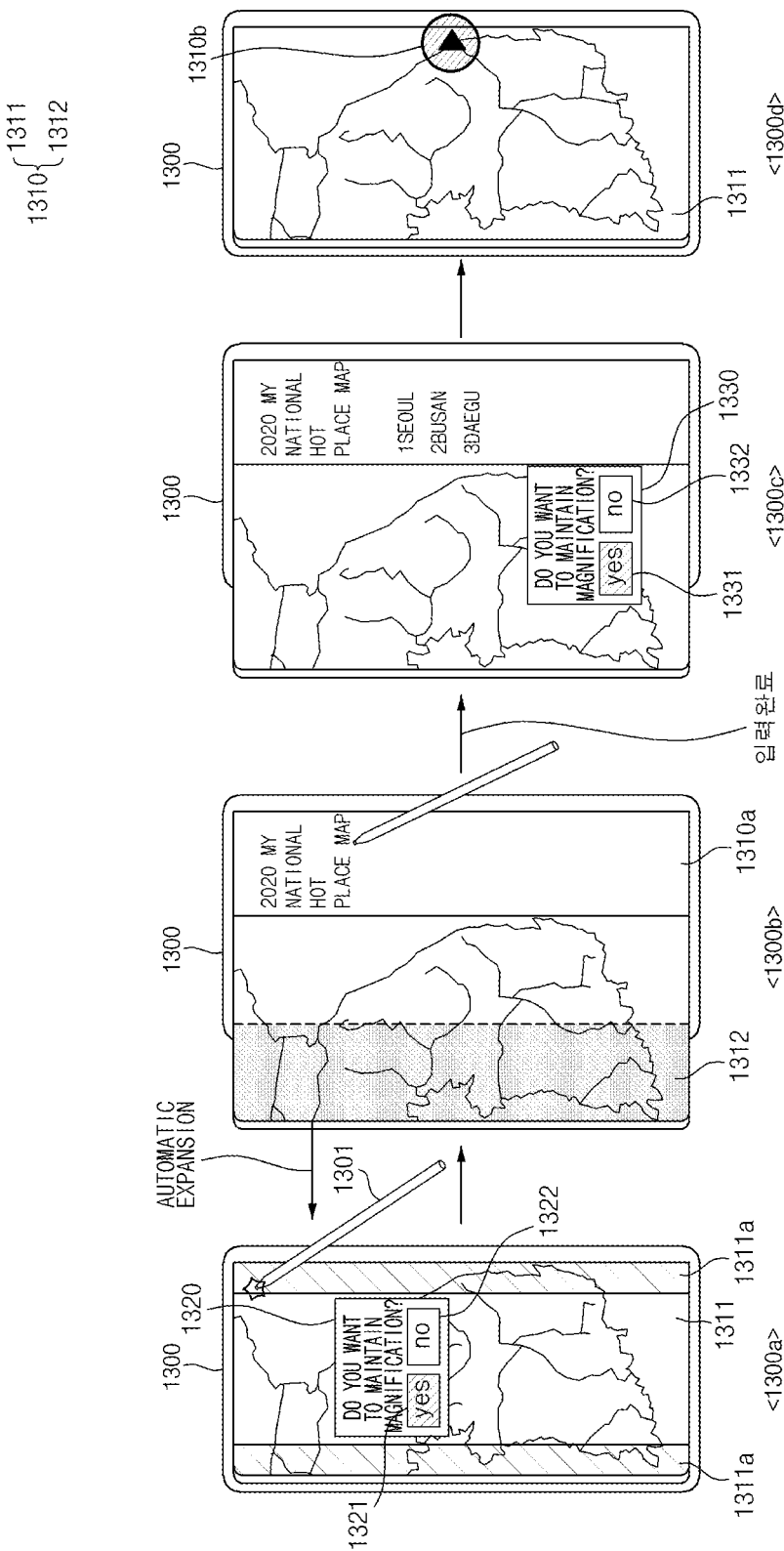
FIG. 13 is a diagram for describing an operation of setting a display magnification of a display in an example electronic device according to various embodiments.

FIG. 13 is a diagram for describing an example operation of setting a display magnification of a display in an example electronic device according to various embodiments.

Referring to FIG. 13, an electronic device 1300 (e.g., the electronic device 101 in FIG. 1, the electronic device 400 in FIG. 4, the electronic device 600 in FIG. 6, the electronic device 700 in FIG. 7, the electronic device 800 in FIG. 8, the electronic device 900 in FIG. 9, the electronic device 1000 in FIG. 10, the electronic device 1100 in FIG. 11, or the electronic device 1200 in FIG. 12) may include an expandable and retractable display 1310 (e.g., the display module 160 of FIG. 1 or the display 410 of FIG. 4, the display described with reference to FIG. 5, the display 610 of FIG. 6, or the display 710 in FIG. 7, the display 810 in FIG. 8, the display 910 in FIG. 9, the display 1010 in FIG. 10, the display 1110 in FIG. 11, or the display 1210 in FIG. 12). The display 1310 may include a first area 1311 and a second area 1312. For example, the display 1310 may include the first area 1311 exposed to the outside of the electronic device 1300 in a retracted and/or expanded state. For example, the display 1310 may include the second area 1312 that is not exposed to the outside of the electronic device 1300 in a retracted state. In the following, contents overlapping with the above description are omitted.

Referring to FIG. 13, the electronic device 1300 may include the retracted display 1310 (e.g., a display in the first state) in state <1300*a*>. For example, the electronic device 1300 may display an execution screen of an application being executed on the first area 1311 at a first magnification value (or a reference magnification value). According to an embodiment, the electronic device 1200 may display, on the display 1310 (or the retracted display 1310), a first user interface 1320 configured to select whether to maintain the display magnification of the expanded display 1310 (e.g., the display in the second state), based on the specified input applied to a pre-specified area 1311*a*. For example, the first user interface 1320 may include a first icon 1321 (e.g., yes), and a second icon 1322 (e.g., no). According to an embodiment, the electronic device 1300 may receive an input for selecting the first icon 1321 (e.g., yes) through a user and/or an external input device 1301.

Referring to FIG. 13, the electronic device 1300 may expand the display 1310 in state <1300*b*>. For example, the electronic device 1300 may expand the display 1310 based on an input for selecting the first icon 1321. According to an embodiment, the electronic device 1300 may maintain the display magnification of the expanded display 1310 at a first magnification value based on an input for selecting the first icon 1321. For example, the electronic device 1300 may display an execution screen of an application being executed on the expanded display 1310 at a first magnification value. For example, to maintain the display magnification of the execution screen of the application being executed identical one of display magnification (e.g., the first magnification value) before the display 1310 is expanded, the electronic device 1300 may load a new template of the application being executed and display the loaded template on the first area 1311 or the second area 1312 of the expanded display 1310. According to an embodiment, the electronic device 1300 may receive content through a user and/or the external input device 1301, and display content on a partial area 1310*a* of the expanded display 1310.

Referring to FIG. 13, the electronic device 1300 may display in state <1300*c*>, on the display 1310 (or the expanded display 1310), a second user interface 1330 configured to select whether to maintain a display magnification when retracting the display 1310 based on a specified input. For example, the second user interface 1330 may include a third icon 1331 (e.g., yes), and a fourth icon 1332 (e.g., no). According to an embodiment, the electronic device 1300 may receive an input for selecting the third icon 1331 (e.g., yes) included in the second user interface 1330 through a user and/or the external input device 1301.

Referring to FIG. 13, the electronic device 1300 may retract the display 1310 based on user a user input for selecting the third icon 1331 (e.g., yes) in state <1300*d*>. The electronic device 1300 may maintain the display magnification of the retracted display 1310 the same as the display magnification of the expanded display 1310 based on a user input for selecting the third icon 1331 (e.g., yes). According to an embodiment, the electronic device 1300 may hide the content displayed on the partial area 1310*a* not to be displayed on the retracted display 1310. According to an embodiment, the electronic device 1300 may display an indicator 1310*b* indicating that hidden content exists on a portion of the retracted display 1310.

According to an example embodiment of the disclosure, an electronic device (e.g., the electronic device 400 in FIG. 1, the electronic device 600 in FIG. 4, the electronic device 700 in FIG. 6, the electronic device 800 in FIG. 7, the electronic device 900 in FIG. 8, the electronic device 1000 in FIG. 9, the electronic device 1100 in FIG. 10, the electronic device 1200 in FIG. 11, or the electronic device 1300 in FIG. 12, or the electronic device 1300 in FIG. 13) may include a display (e.g., the display module 160 of FIG. 1 or the display 410 of FIG. 4, the display described with reference to FIG. 5, the display 610 of FIG. 6, or the display 710 in FIG. 7, the display 810 in FIG. 8, the display 910 in FIG. 9, the display 1010 in FIG. 10, the display 1110 in FIG. 11, or the display 1210 in FIG. 12, or the display 1310 in FIG. 13) in which a display area of the display is expandable and retractable, a memory (e.g., the memory 130 of FIG. 1 or the memory 420 of FIG. 4), and a processor (e.g., the processor 120 of FIG. 1 or the processor 430 of FIG. 4) operatively connected to the display and the memory. According to an embodiment, the memory may include instructions that, when executed, cause the processor to display an execution screen of an application being executed on the display area at a first magnification value, expand the display area based on a first specified input, determine whether to maintain a display magnification of the display at the first magnification value, or change the display magnification of the display to a second magnification value different from the first magnification value, based at least in part on the first specified input, information related to the application, or first user content included in the execution screen, and display the execution screen on the expanded display area based on the determined display magnification.

According to an example embodiment, the instructions may cause the processor to display a first user interface configured to select whether to maintain the display magnification of the display on the display area based on the display area being expanded, and determine the display magnification of the display based on a first user input received through the first user interface.

According to an example embodiment, the instructions may cause the processor to determine the display magnification of the display based on a use history of the application.

According to an example embodiment, the instructions may cause the processor to maintain the display magnification of the display at the first magnification value based on the first specified input being a drag input in a first direction, and set the display magnification of the display to the second magnification value based on the first specified input being a drag input in a second direction different from the first direction.

According to an example embodiment, the instructions may cause the processor to maintain the display magnification of the display at the first magnification value based on a type of the first user content corresponding to at least one of text, a table, or a score.

According to an example embodiment, the instructions may cause the processor to maintain a display property of second user content to be input through the expanded display area to be the same as a display property of the first user content, based on a type of the first user content corresponding to at least one of text, a table, or a score.

According to an example embodiment, the display property may include at least one of line thickness, line type, line color, or font type.

According to an example embodiment, the instructions may cause the processor to display a first user interface configured to select whether to maintain the display magnification of the display on at least a portion of the display area based on a type of the first user content corresponding to a drawing, and determine the display magnification of the display based on a first user input received through the first user interface.

According to an example embodiment, the instructions may cause the processor to retract the expanded display area to an original state based on a second specified input, determine whether to maintain a display magnification of the display with the retracted display area at the display magnification of the display with the expanded display area based at least in part on the second specified input or the first user content displayed on the expanded display area, and display the execution screen including the first user content on the retracted display area based on the determined display magnification.

According to an example embodiment, the instructions may cause the processor to display a second user interface configured to determine whether to maintain the display magnification of the display on the display area based on the display area being retracted, and determine the display magnification of the display based on a second user input received through the second user interface.

Figure 14:
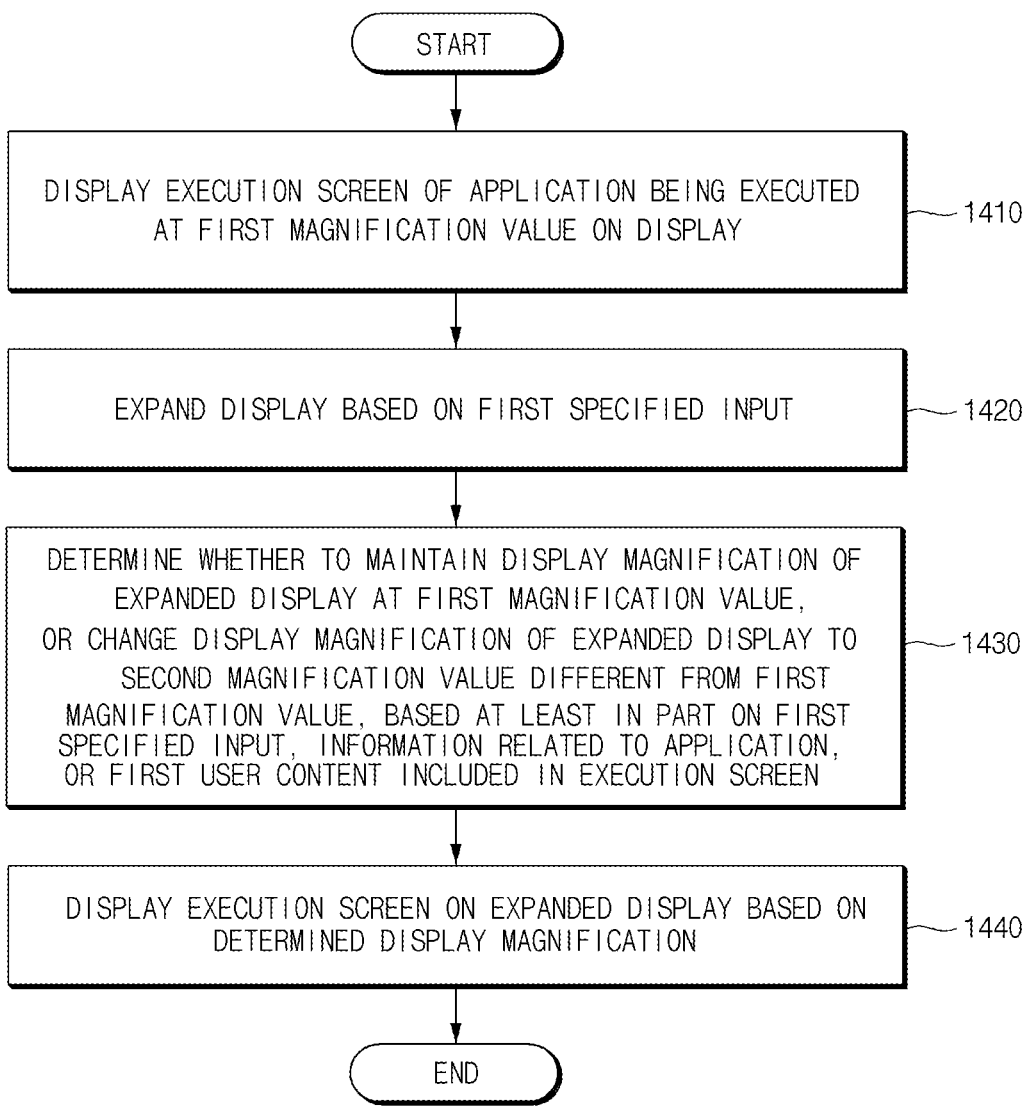
FIG. 14 is a flowchart of an example operation method for an example electronic device according to various embodiments.

FIG. 14 is a flowchart of an example operation method for an example electronic device according to various embodiments.

According to an embodiment, in operation 1410, an electronic device (e.g., the electronic device 101 in FIG. 1, the electronic device 400 in FIG. 4, the electronic device 600 in FIG. 6, the electronic device 700 in FIG. 7, the electronic device 800 in FIG. 8, the electronic device 900 in FIG. 9, the electronic device 1000 in FIG. 10, the electronic device 1100 in FIG. 11, the electronic device 1200 in FIG. 12 or the electronic device 1300 in FIG. 13) may display an execution screen of an application being executed at a first magnification value on a display (e.g., the display module 160 of FIG. 1, the display 410 of FIG. 4, the display described with reference to FIG. 5, the display 610 of FIG. 6, or the display 710 in FIG. 7, the display 810 in FIG. 8, the display 910 in FIG. 9, the display 1010 in FIG. 10, the display 1110 in FIG. 11, the display 1210 in FIG. 12, or the display 1310 in FIG. 13).

According to an embodiment, in operation 1420, the electronic device may expand the display based on a specified input. For example, the electronic device may expand the display when receiving a specified input in a specified area.

According to an embodiment, in operation 1430, the electronic device may determine whether to maintain the display magnification of the expanded display (e.g., the display in the second state) at the first magnification value or change the display magnification of the expanded display to a second magnification value different from the first magnification value, based at least in part on the first specified input, information related to the application or user content included in the execution screen according to the specified input.

For example, according to a drag input in a first direction, the electronic device may determine to maintain the display magnification of the expanded display at the first magnification value. For example, according to a drag input in a second direction, the electronic device may determine to change the display magnification of the expanded display to the second magnification value. For example, when information included in the use history of the application indicates that the number of times the display magnification of the expanded display is maintained without changing is relatively large (e.g., greater than some predetermined number of times), the electronic device may determine to maintain the display magnification of the expanded display at the first magnification value. For example, when information included in the use history of the application indicates that the number of times the display magnification of the expanded display is maintained without changing is relatively small (e.g., less that some predetermined number of times), the electronic device may determine to change the display magnification of the expanded display to the second magnification value. For example, when the first user content corresponds to at least one of text, a table, or a score, the electronic device may determine to maintain the display magnification of the expanded display at the first magnification value. For example, when the first user content corresponds to drawings, the electronic device may determine to change the display magnification of the display to the second magnification value.

According to an example embodiment, in operation 1440, the electronic device may display an execution screen on the expanded display based on the determined display magnification.

Figure 15:
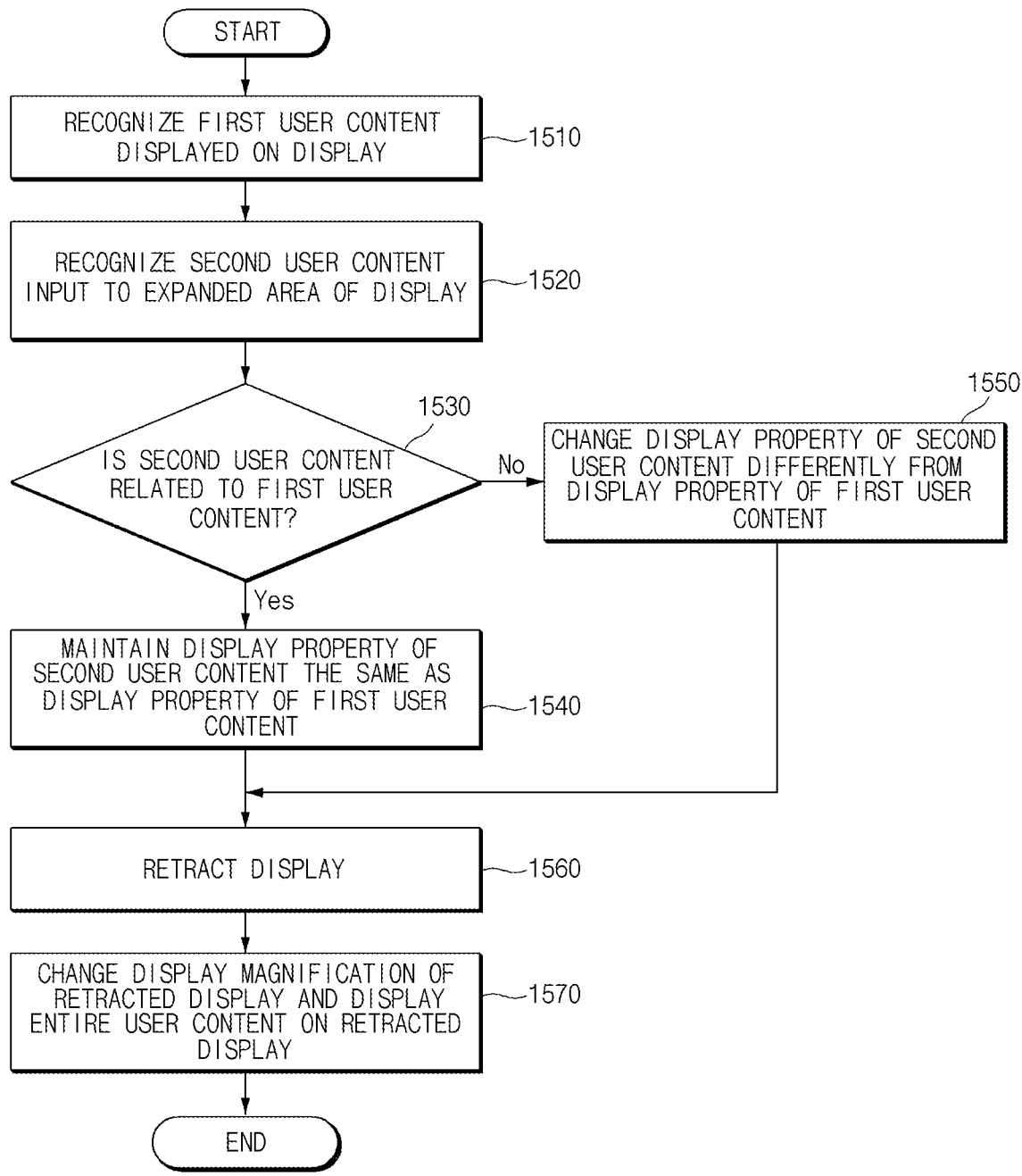
FIG. 15 is a flowchart of an example operation method of an example electronic device according to various embodiments.

FIG. 15 is a flowchart of an example operation method of an example electronic device according to various embodiments.

According to an embodiment, in operation 1510, an electronic device (e.g., the electronic device 101 in FIG. 1, the electronic device 400 in FIG. 4, the electronic device 600 in FIG. 6, the electronic device 700 in FIG. 7, the electronic device 800 in FIG. 8, the electronic device 900 in FIG. 9, the electronic device 1000 in FIG. 10, the electronic device 1100 in FIG. 11, the electronic device 1200 in FIG. 12, the electronic device 1300 in FIG. 13, or the electronic device described with reference to FIG. 14) may recognize first user content displayed on a display (e.g., the display module 160 of FIG. 1, the display 410 of FIG. 4, the display described with reference to FIG. 5, the display 610 of FIG. 6, or the display 710 in FIG. 7, the display 810 in FIG. 8, the display 910 in FIG. 9, the display 1010 in FIG. 10, the display 1110 in FIG. 11, the display 1210 in FIG. 12, the display 1310 in FIG. 13, or the display described with reference to FIG. 14).

According to an embodiment, in operation 1520, the electronic device may recognize second user content input to an expanded area of the display.

According to an embodiment, in operation 1530, the electronic device may determine whether the second user content is related to the first user content. For example, the electronic device may determine a relevance of the second user content to the first user content using context of the first user content. When it is determined that the second user content is related to the first user content or has a relatively high relevance to the first user content (e.g., relevance greater than a predetermined relevance), the electronic device may perform operation 1540. When it is determined that the second user content has no relevance or a relatively small relevance to the first user content (e.g., relevance less than a predetermined relevance), the electronic device may perform operation 1550.

According to an embodiment, in operation 1540, the electronic device may maintain a display property of the second user content to be identical to that of the first user content. For example, the display property may include at least one of line thickness, line type, line color, or font type. For example, when a font type of the first user content corresponds to a first font, the electronic device may display the second user content with the first font on the expanded display.

According to an embodiment, in operation 1550, the electronic device may change the display property of the second user content to be different from a display property of the first user content. For example, when a font type of the first user content corresponds to a first font, the electronic device may display the second user content with a second font on the expanded display. For example, the electronic device may provide the user with a user interface configured to select (or determine) a display property of the second user content.

According to an embodiment, in operation 1560, the electronic device may retract the display again based on a specified input.

According to an embodiment, in operation 1570, the electronic device may change the display magnification of the retracted display (e.g., a display in the first state) and then display the entire user content on the retracted display. For example, to display the first user content and the second user content, which had been displayed on an expanded display, on a retracted display, the electronic device may change the display magnification of the retracted display. The electronic device may display the first user content and the second user content at a changed display magnification on the retracted display.

An example operation method for an electronic device (e.g., the electronic device 400 in FIG. 1, the electronic device 600 in FIG. 4, the electronic device 700 in FIG. 6, the electronic device 800 in FIG. 7, the electronic device 900 in FIG. 8, the electronic device 1000 in FIG. 9, the electronic device 1100 in FIG. 10, the electronic device 1200 in FIG. 11, or the electronic device 1300 in FIG. 12, or the electronic device 1300 in FIG. 13) including a display in which a display area of the display is expandable and retractable may include displaying an execution screen of an application being executed at a first magnification value on the display area (e.g., the display module 160 of FIG. 1 or the display 410 of FIG. 4, the display described with reference to FIG. 5, the display 610 of FIG. 6, or the display in FIG. 7, the display 810 in FIG. 8, the display 910 in FIG. 9, the display 1010 in FIG. 10, the display 1110 in FIG. 11, or the display 1210 in FIG. 12, or the display 1310 in FIG. 13), expanding the display area based on a first specified input, determining whether to maintain a display magnification of the display at the first magnification value, or change the display magnification of the display to a second magnification value different from the first magnification value, based at least in part on the first specified input, information related to the application, or first user content included in the execution screen, and displaying the execution screen on the expanded display area based on the determined operation display magnification.

According to an example embodiment, the determining of whether to maintain the display magnification may include displaying a first user interface configured to select whether or not to maintain the display magnification of the display on the display area based on the display area being expanded and determining the display magnification of the display based on a first user input received through the first user interface.

According to an example embodiment, the determining of whether to maintain the display magnification may include determining the display magnification of the display based on a use history of the application.

According to an example embodiment, the determining of whether to maintain the display magnification may include maintaining the display magnification of the display at the first magnification value based on the first specified input being a drag input in a first direction and setting the display magnification of the display to the second magnification value based on the first specified input being a drag input in a second direction different from the first direction.

According to an example embodiment, the determining of whether to maintain the display magnification may include maintaining the display magnification of the display at the first magnification value based on a type of the first user content corresponding to at least one of text, a table, or a score.

According to an example embodiment, the operation method may further include maintaining a display property of second user content to be input through the expanded display area to be the same as a display property of the first user content, based on a type of the first user content corresponding to at least one of text, a table, or a score.

According to an example embodiment, the display property may include at least one of line thickness, line type, line color, or font type.

According to an example embodiment, the operation method may further include displaying a first user interface configured to select whether to maintain the display magnification of the display on at least a portion of the display area based on a type of the first user content corresponding to a drawing, and determining the display magnification of the display based on a first user input received through the first user interface.

According to an example embodiment, the operation method may further include retracting the expanded display area to its original state based on a second specified input, determining whether to maintain a display magnification of the display with the retracted display area to be the same as the display magnification of the display with the expanded display area based at least in part on the second specified input or the first user content displayed on the expanded display area, and displaying the execution screen including the first user content on the retracted display area based on the determined display magnification.

According to an example embodiment, the operation method may further displaying a second user interface configured to determine whether to maintain the display magnification of the display on the display area based on the display being retracted, and determining the display magnification of the display based on a second user input received through the second user interface.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and are intended to include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" simply refers to, for example, the storage medium being a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing including a first housing part and a second housing part configured to movably engage with the first housing part between a retracted position and an extended position;
   a flexible display coupled to the first housing part and the second housing part such that a size of an area of the flexible display that is visible from a front side of the housing changes as the second housing part is moved between the retracted position and the extended position;

an actuator configured to move the second housing part with respect to the first housing part;

a memory; and at least one processor operatively connected to the flexible display, the actuator and the memory, wherein the memory includes instructions that, when executed by the at least one processor, cause the processor to:

display first content corresponding to a user input received through an execution screen of an application being executed, at a first magnification value on a first area of the flexible display that is visible from the front side of the housing as the second housing part is moved to the retracted position;

control the actuator to move the second housing part to the extended position based on a first specified input;

determine, based at least in part on the first content included in the execution screen, a display magnification of a second area of the flexible display that is visible from the front side of the housing as the second housing part is moved to the extended position, to be a second magnification value different from the first magnification value; and display the first content on the second area of the flexible display based on the determined second magnification value, wherein instructions, when executed by the at least one processor, cause the electronic device to:

determine whether the first content includes at least one of text, a table, or a musical score;

based on a determination that the first content includes at least one of the text, the table, or the musical score:

maintain the display magnification of the second area of the flexible display at the first magnification value; and display the first content on the second area of the flexible display based on the first magnification value, and based on a determination that the first content does not include the text, the table, or the musical score:

determine the display magnification of the second area of the flexible display to be the second magnification value; and display the first content on the second area of the flexible display based on the determined second magnification value.

2. The electronic device of claim 1, wherein instructions, when executed by the at least one processor, cause the electronic device to:

display a first user interface configured to enable selection of whether to change the display magnification of the second area of the flexible display based on the second housing part being moved to the extended position; and determine the display magnification of the second area of the flexible display to be the second magnification value, based on a user input received through the first user interface.

3. The electronic device of claim 1, wherein instructions, when executed by the at least one processor, cause the electronic device to determine the display magnification of the second area of the flexible display to be the second magnification value, based on a use history of the application.

4. The electronic device of claim 1, wherein instructions, when executed by the at least one processor, cause the electronic device to:

determine the display magnification of the second area of the flexible display to be the second magnification value based on a drag input in a specified direction received while the second housing part is moved to the extended position.

5. The electronic device of claim 1, wherein instructions, when executed by the at least one processor, cause the electronic device to;

receive, after displaying the first content based on the first magnification value, an additional user input through the execution screen of the application; and display second content corresponding to the additional user input based on the first magnification value.

6. The electronic device of claim 1, wherein instructions, when executed by the at least one processor, cause the electronic device to maintain a display property of the second content to be the same as a display property of the first content.

7. The electronic device of claim 6, wherein the display property includes at least one of line thickness, line type, line color, or font type.

8. The electronic device of claim 1, wherein instructions, when executed by the at least one processor, cause the electronic device to:

display a second user interface configured to enable selection of whether to maintain the display magnification of the second area of the flexible display at the first magnification value, based on the determination that the first content includes at least one of the text, the table, or the musical score; and maintain the display magnification of the second area of the flexible display at the first magnification value based on a user input received through the second user interface.

9. The electronic device of claim 1, wherein instructions, when executed by the at least one processor, cause the electronic device to:

control the actuator to move the second housing part from the extended position to the retracted position based on a second specified input;

determine whether to maintain the display magnification of the first area of the flexible display at the display magnification of the second area of the flexible display based at least in part on the first content or second content displayed on the second area of the flexible display; and display the execution screen including the first content and the second content on the first area of the flexible display based on the determined display magnification.

10. The electronic device of claim 9, wherein instructions, when executed by the at least one processor, cause the electronic device to:

display a third user interface configured to determine whether to maintain the display magnification of the first area of the flexible display based on the second housing part being moved to the retracted position; and determine the display magnification of the first area of the flexible display based on a user input received through the third user interface.

11. An operation method for an electronic device including a housing including a first housing part and a second housing part configured to movably engage with the first housing part between a retracted position and an extended position, a flexible display coupled to the first housing part and the second housing part such that a size of an area of the flexible display that is visible from a front side of the housing changes as the second housing part is moved between the retracted position and the extended position, and an actuator configured to move the second housing part with respect to the first housing part, the method comprising:
- displaying first content corresponding to a user input received through an execution screen of an application being executed on a first area of the flexible display that is visible from the front side of the housing as the second housing part is moved to the retracted position at a first magnification value;
- controlling the actuator to move the second housing part to the extended position based on a first specified input;
- determining, based at least in part on the first content included in the execution screen, a display magnification of a second area of the flexible display that is visible from the front side of the housing as the second housing part is moved to the extended position, to be a second magnification value different from the first magnification value; and
- displaying the first content on the second area of the flexible display based on the determined second magnification value,
- wherein the displaying the first content on the second area of the flexible display includes:
  - determining whether the first content includes at least one of text, a table, or a musical score;
  - based on a determination that the first content includes at least one of the text, the table, or the musical score:
    - maintaining the display magnification of the second area of the flexible display at the first magnification value; and
    - displaying the first content on the second area of the flexible display based on the first magnification value, and
  - based on a determination that the first content does not include the text, the table, or the musical score,
    - determining the display magnification of the second area of the flexible display to be the second magnification value; and
    - displaying the first content on the second area of the flexible display based on the determined second magnification value.

12. The operation method of claim 11, wherein the determining of the display magnification of the second area of the flexible display to be the second magnification value includes:
- displaying a first user interface configured to enable selection of whether or not to change the display magnification of the second area of the flexible display based on the second housing part being moved to the extended position; and
- determining the display magnification of the second area of the flexible display to be the second magnification value, based on a user input received through the first user interface.

13. The operation method of claim 11, wherein the determining of the display magnification of the second area of the flexible display to be the second magnification value includes determining the display magnification of the second area of the flexible display to be the second magnification value, based on a use history of the application.

14. The operation method of claim 11, wherein the determining of the display magnification to be the second magnification value includes:
- determining the display magnification of the second area of the flexible display to be the second magnification value based on a drag input in a specified direction received while the second housing part is moved to the extended position.

15. The operation method of claim 11, further comprising:
- receiving, after displaying the first content based on the first magnification value, an additional user input through the execution screen of the application; and
- displaying second content corresponding to the additional user input based on the first magnification value.

16. The operation method of claim 15, wherein the displaying of the second content corresponding to the additional user input includes:
- maintaining a display property of the second content to be the same as a display property of the first content.

17. The operation method of claim 16, wherein the display property includes at least one of line thickness, line type, line color, or font type.

18. The operation method of claim 11, wherein the maintaining the display magnification at the first magnification value includes:
- displaying a second user interface configured to enable selection of whether to maintain the display magnification of the second area of the flexible display at the first magnification value, based on the determination that the first content includes at least one of the text, the table, or the musical score; and
- maintaining the display magnification of the second area of the flexible display at the first magnification value based on a user input received through the second user interface.

19. The operation method of claim 11, further comprising:
- controlling the actuator to move the second housing part from the extended position to the retracted position based on a second specified input;
- determining whether to maintain the display magnification of the first area of the flexible display at the display magnification of the second area of the flexible display based at least in part on the first content or second content displayed on the second area of the flexible display; and
- displaying the execution screen including the first content and the second content on the first area of the flexible display based on the determined display magnification.

20. The operation method of claim 19, wherein the determining of whether to maintain the display magnification of the first area of the flexible display includes:
- displaying a third user interface configured to determine whether to maintain the display magnification of the first area of the flexible display based on the second housing part being moved to the retracted position; and
- determining the display magnification of the first area of the flexible display based on a user input received through the third user interface.

* * * * *